United States Patent
Zeng et al.

(10) Patent No.: US 9,396,011 B2
(45) Date of Patent: Jul. 19, 2016

(54) ALGORITHM AND APPARATUS TO DEPLOY VIRTUAL MACHINE MONITOR ON DEMAND

(71) Applicant: QUALCOMM Incorporated, San Diego, CA (US)

(72) Inventors: Thomas M. Zeng, San Diego, CA (US); Azzedine Touzni, San Diego, CA (US); Philip T. Mueller, Jr., Longmont, CO (US); Piyush Patel, Cary, NC (US)

(73) Assignee: QUALCOMM INCORPORATED, San Diego, CA (US)

( * ) Notice: Subject to any disclaimer, the term of this patent is extended or adjusted under 35 U.S.C. 154(b) by 594 days.

(21) Appl. No.: 13/796,442

(22) Filed: Mar. 12, 2013

(65) Prior Publication Data

US 2014/0282501 A1    Sep. 18, 2014

(51) Int. Cl.
  *G06F 9/455*   (2006.01)
  *G06F 9/50*    (2006.01)
  *G06F 12/10*   (2016.01)
  *G06F 12/14*   (2006.01)
  *G06F 21/53*   (2013.01)

(52) U.S. Cl.
  CPC ........ *G06F 9/45545* (2013.01); *G06F 9/45533* (2013.01); *G06F 9/45558* (2013.01); *G06F 9/5016* (2013.01); *G06F 12/1491* (2013.01); *G06F 21/53* (2013.01); *G06F 12/10* (2013.01); *G06F 2009/45583* (2013.01); *G06F 2009/45587* (2013.01); *G06F 2212/151* (2013.01); *Y02B 60/1225* (2013.01); *Y02B 60/146* (2013.01); *Y02B 60/148* (2013.01)

(58) Field of Classification Search
  None
  See application file for complete search history.

(56) References Cited

U.S. PATENT DOCUMENTS

| | | | |
|---|---|---|---|
| 7,461,232 B2 | 12/2008 | Nicolai | |
| 8,140,820 B2 | 3/2012 | Mansell et al. | |
| 2005/0091365 A1* | 4/2005 | Lowell et al. | 709/224 |
| 2005/0138370 A1* | 6/2005 | Goud et al. | 713/164 |
| 2005/0289542 A1* | 12/2005 | Uhlig et al. | 718/1 |
| 2007/0226795 A1* | 9/2007 | Conti et al. | 726/22 |
| 2009/0222816 A1* | 9/2009 | Mansell et al. | 718/1 |
| 2011/0093750 A1* | 4/2011 | Williams et al. | 714/47.2 |
| 2011/0179255 A1 | 7/2011 | Pathirane et al. | |
| 2011/0283071 A1 | 11/2011 | Yokoya et al. | |
| 2012/0079479 A1* | 3/2012 | Hakewill | G06F 9/45558 718/1 |

* cited by examiner

*Primary Examiner* — Emerson Puente
*Assistant Examiner* — Jonathan R Labud
(74) *Attorney, Agent, or Firm* — The Marbury Law Group, PLLC

(57) ABSTRACT

In the various aspects, virtualization techniques may be used to improve performance and reduce the amount of power consumed by selectively enabling a hypervisor operating on a computing device during sandbox sessions. In the various aspects, a high-level operating system may allocate memory such that its intermediate physical addresses are equal to the physical addresses. When the hypervisor is disabled, the hypervisor may suspend second stage translations from intermediate physical addresses to physical addresses. During a sandbox session, the hypervisor may be enabled and resume performing second stage translations.

48 Claims, 19 Drawing Sheets

ALGORITHM AND APPARATUS TO DEPLOY VIRTUAL MACHINE MONITOR ON DEMAND

BACKGROUND

Generally, virtualization technology enables the abstraction (or virtualization) of computing resources by placing a software control program (e.g., a Virtual Machine Monitor "VMM" or hypervisor) between the operating system and the hardware. The hypervisor executes in privileged mode and may host multiple operating systems (called guest operating systems). Each guest operating system communicates with the hypervisor in the same manner it would communicate with the physical hardware, viewing the combination of the hypervisor and hardware as a single, virtual machine. This allows each guest operating system to operate under the illusion of having exclusive access to the processors, peripherals, memory and I/O.

Operating systems are responsible for partitioning the physical memory across multiple processes. In systems that include a guest operating system running on top of a virtual machine, the memory allocated by the guest operating system is not the true physical memory, but an intermediate physical memory. On such systems, the hypervisor is responsible for the actual allocation of the physical memory.

Most processors only support one stage of memory address space translation, and the hypervisor manages the relationship between virtual addresses (VA), intermediate physical addresses (IPA), and physical addresses (PA). This is generally achieved by the hypervisor maintaining its own translation tables (called shadow translation tables), which are derived by interpreting each of the guest operating system's translation tables. Specifically, the hypervisor ensures that all changes to the guest operating system's translation tables are reflected in the shadow structures, as well as enforces protection and redirecting access faults to the appropriate stage.

Unlike the single stage processors discussed above, ARM processor systems provide hardware assistance for both stages of memory translation (e.g., via ARM Virtualization Extensions such as System Memory Management Unit "SMMU"). For example, ARM processors include Virtualization Extensions that enable a two stage translation in which virtual addresses (VA) are translated to intermediate physical addresses (IPA) in the first stage (i.e., a first stage translation), and the intermediate physical addresses (IPA) are translated to physical addresses in the second stage (i.e., a second stage translation). This reduces the overheads associated with the hypervisor.

SUMMARY

The various aspects include computing devices and methods for selectively implementing a hypervisor to efficiently enforce access control to protect data and/or software when required. In the various aspects, the hypervisor is normally disabled and is enabled when a condition is detected that would require the hypervisor to implement access control (i.e., a "sandbox session"). A high-level operating system (HLOS) may operate in a virtual machine managed by the hypervisor. The HLOS may maintain an intermediate physical address page table for use in allocating virtual addresses to various processes or applications running on the HLOS. The HLOS may allocate memory directly from the physical memory address space, thereby ensuring that the intermediate physical memory addresses are always the same as the physical memory addresses. By ensuring that the HLOS can allocate memory so that intermediate physical addresses are equal to physical addresses at all times, the hypervisor may be selectively enabled when there is a need for a sandboxed session, and disabled when there is no current sandboxed session. While disabled, the hypervisor may not perform Stage 2 translations from intermediate physical addresses to physical addresses. Also, while the hypervisor is disabled, the HLOS may allocate memory from the entire physical memory address space.

In the various aspects, the hypervisor may be enabled for the duration of a sandbox session. While enabled, the hypervisor may resume performing Stage 2 translations from intermediate physical addresses to physical addresses. Also, while enabled, and hypervisor may restrict the HLOS's access to the physical memory address space, thereby allowing the HLOS to allocate memory from only a portion of the physical memory address space, and in some aspects, restrict the HLOS's access to hardware interrupts and/or hardware timers. By configuring the hypervisor not to perform Stage 2 translations, among other things, while sandboxing is not needed (i.e., while the hypervisor is disabled), the various aspects may improve overall performance of the computing device while providing necessary security as appropriate.

The various aspects include a method of managing memory on a computing device by initializing a hypervisor, a security monitor, and a high-level operating system (HLOS); disabling the hypervisor after initialization; monitoring for a signal from the security monitor to start a sandbox session; enabling the hypervisor when the signal is received to start the sandbox session; and implementing access control while the hypervisor is enabled. In an aspect, the security monitor may be an ARM TrustZone®. In another aspect, the hypervisor may be disabled or enabled across at least one of an integrated circuit boundary and a chip boundary. In another aspect, initializing the hypervisor may include configuring the HLOS to allocate memory space such that each intermediate physical address in the HLOS's intermediate physical address space is equal to a corresponding physical address in a physical address space. In yet another aspect, initializing the hypervisor may also include authenticating the hypervisor's code and data with the security monitor. In another aspect, the method may include configuring the hypervisor's code and data to be inaccessible to at least one of a digital signal processor and a CPU included in the digital signal processor while the hypervisor is enabled.

In another aspect, disabling the hypervisor may include configuring all system memory management units (SMMU) context banks to bypass second stage translation and turning off second stage translations for the HLOS. In an aspect, disabling the hypervisor may include at least one of suspending restricting the HLOS's accesses to hardware interrupts, suspending restricting the HLOS's accesses to hardware timers, and suspending restricting the HLOS's I/O accesses.

In another aspect, the method may include determining whether the sandbox session is over, performing a sandbox session tear-down procedure when it is determined that the sandbox session is over, and disabling the hypervisor after performing the sandbox session tear-down procedure. In another aspect, determining whether the sandbox session is over may include receiving another signal indicating that the sandbox session is over. In yet another aspect, performing the sandbox session tear-down procedure may include freeing all buffers for a sandboxed component and restoring second stage translation page tables to remove all fragmentations.

In an aspect, enabling the hypervisor may include enabling PL0 and PL1 second stage memory management units, configuring interrupt requests to be taken in hypervisor mode, and calling SMMU drivers to put all active SMMU context banks in first stage translations nested within second stage translations. In another aspect, the method may also include starting interprocessor communications with a digital signal processor. In another aspect, the method may further include handling SMMU faults.

In another aspect, implementing access control may include implementing second stage translations. In yet another aspect, implementing access control may include at least one of resuming restricting the HLOS's accesses to hardware interrupts, resuming restricting the HLOS's accesses to hardware timers, and resuming restricting the HLOS's I/O accesses. In an aspect, implementing second stage translations may include monitoring for an attempt by the HLOS to allocate memory, and providing to the HLOS one or more physical addresses in a physical address space accessible to the HLOS when the HLOS attempts to allocate memory.

In another aspect, the method may include determining whether a sandboxed component is attempting to allocate memory when the HLOS attempts to allocate memory and providing physical addresses to the sandboxed component from the physical addresses in a physical address space when it is determined that the sandboxed component is attempting to allocate memory. In an aspect, providing the physical addresses to the sandboxed component may include removing the physical addresses to be provided to the sandboxed component from the physical addresses in the physical address space that are accessible to the HLOS and providing the physical addresses to the sandboxed component from available physical addresses in the physical address space.

Further aspects include a computing device that may include a memory, and a processor coupled to the memory, wherein the processor is configured with processor-executable instructions to perform operations that may include initializing a hypervisor, a security monitor, and a high-level operating system (HLOS), disabling the hypervisor after initialization, monitoring for a signal from the security monitor to start a sandbox session, enabling the hypervisor when the signal is received to start the sandbox session, and implementing access control while the hypervisor is enabled. In another aspect, the security monitor may be an ARM TrustZone®. In another aspect, the processor may be configured with processor-executable instructions to perform operations such that the hypervisor may be disabled or enabled across at least one of an integrated circuit boundary and a chip boundary.

In yet another aspect, the processor may be configured with processor-executable instructions to perform operations such that initializing the hypervisor includes configuring the HLOS to allocate memory space such that each intermediate physical address in the HLOS's intermediate physical address space is equal to a corresponding physical address in a physical address space. In an aspect, the processor may be configured with processor-executable instructions to perform operations such that initializing the hypervisor includes authenticating the hypervisor's code and data with the security monitor. In another aspect, the processor may be configured with processor-executable instructions to perform operations that include configuring the hypervisor's code and data to be inaccessible to at least one of a digital signal processor and a CPU included in the digital signal processor while the hypervisor is enabled.

In an aspect, the processor may be configured with processor-executable instructions to perform operations such that disabling the hypervisor includes configuring all system memory management units (SMMU) context banks to bypass second stage translation, and turning off second stage translations for the HLOS. In another aspect, the processor may be configured with processor-executable instructions to perform operations such that disabling the hypervisor further includes at least one of suspending restricting the HLOS's accesses to hardware interrupts, suspending restricting the HLOS's accesses to hardware timers, and suspending restricting the HLOS's I/O accesses.

In another aspect, the processor may be configured with processor-executable instructions to perform operations that include determining whether the sandbox session is over, performing a sandbox session tear-down procedure when it is determined that the sandbox session is over, and disabling the hypervisor after performing the sandbox session tear-down procedure. In another aspect, the processor may be configured with processor-executable instructions to perform operations such that determining whether the sandbox session is over includes receiving another signal indicating that the sandbox session is over. In yet another aspect, the processor may be configured with processor-executable instructions to perform operations such that performing the sandbox session tear-down procedure includes freeing all buffers for a sandboxed component and restoring second stage translation page tables to remove all fragmentations.

In an aspect, the processor may be configured with processor-executable instructions to perform operations such that enabling the hypervisor includes enabling PL0 and PL1 second stage memory management units, configuring interrupt requests to be taken in hypervisor mode, and calling SMMU drivers to put all active SMMU context banks in first stage translations nested within second stage translations. In another aspect, the processor may be configured with processor-executable instructions to perform operations that include starting interprocessor communications with a digital signal processor. In yet another aspect, the processor may be configured with processor-executable instructions to perform operations that include handling SMMU faults.

In an aspect, the processor may be configured with processor-executable instructions to perform operations such that implementing access control includes implementing second stage translations. In another aspect, the processor may be configured with processor-executable instructions to perform operations such that implementing access control further includes at least one of resuming restricting the HLOS's accesses to hardware interrupts, resuming restricting the HLOS's accesses to hardware timers, and resuming restricting the HLOS's I/O accesses.

In an aspect, the processor may be configured with processor-executable instructions to perform operations such that implementing second stage translations includes monitoring for an attempt by the HLOS to allocate memory and providing to the HLOS one or more physical addresses in a physical address space accessible to the HLOS when the HLOS attempts to allocate memory. In another aspect, the processor may be configured with processor-executable instructions to perform operations that further include determining whether a sandboxed component is attempting to allocate memory when the HLOS attempts to allocate memory and providing physical addresses to the sandboxed component from the physical addresses in a physical address space when it is determined that the sandboxed component is attempting to allocate memory. In yet another aspect, the processor may be configured with processor-executable instructions to perform operations such that providing the physical addresses to the sandboxed component includes removing the physical addresses to be provided to the sandboxed component from the physical addresses in the physical address space that are accessible to the HLOS and providing the physical addresses to the sandboxed component from available physical addresses in the physical address space.

Further aspects include a computing device including means for initializing a hypervisor, a security monitor, and a high-level operating system (HLOS); means for disabling the hypervisor after initialization; means for monitoring for a signal from the security monitor to start a sandbox session; means for enabling the hypervisor when the signal is received to start the sandbox session; and means for implementing access control while the hypervisor is enabled. In another aspect, the security monitor may be an ARM TrustZone®. In yet another aspect, the hypervisor may be disabled or enabled across at least one of an integrated circuit boundary and a chip boundary. In another aspect, means for initializing the hypervisor may include means for configuring the HLOS to allocate memory space such that each intermediate physical address in the HLOS's intermediate physical address space is equal to a corresponding physical address in a physical address space. In another aspect, means for initializing the hypervisor further may include means for authenticating the hypervisor's code and data with the security monitor. In yet another aspect, the computing device may include means for configuring the hypervisor's code and data to be inaccessible to at least one of a digital signal processor and a CPU included in the digital signal processor while the hypervisor is enabled.

In an aspect, means for disabling the hypervisor may include means for configuring all system memory management units (SMMU) context banks to bypass second stage translation and means for turning off second stage translations for the HLOS. In another aspect, means for disabling the hypervisor further may include at least one of means for suspending restricting the HLOS's accesses to hardware interrupts, means for suspending restricting the HLOS's accesses to hardware timers, and means for suspending restricting the HLOS's I/O accesses.

In an aspect, the computing device may further include means for determining whether the sandbox session is over, means for performing a sandbox session tear-down procedure when it is determined that the sandbox session is over, and means for disabling the hypervisor after performing the sandbox session tear-down procedure. In another aspect, means for determining whether the sandbox session is over may include means for receiving another signal indicating that the sandbox session is over. In another aspect, means for performing the sandbox session tear-down procedure may include means for freeing all buffers for a sandboxed component and means for restoring second stage translation page tables to remove all fragmentations.

In an aspect, means for enabling the hypervisor may include means for enabling PL0 and PL1 second stage memory management units, means for configuring interrupt requests to be taken in hypervisor mode, and means for calling SMMU drivers to put all active SMMU context banks in first stage translations nested within second stage translations. In another aspect, the computing device may include means for starting interprocessor communications with a digital signal processor. In yet another aspect, the computing device may include means for handling SMMU faults.

In an aspect, means for implementing access control may include means for implementing second stage translations. In another aspect, means for implementing access control may include at least one of means for resuming restricting the HLOS's accesses to hardware interrupts, means for resuming restricting the HLOS's accesses to hardware timers, and means for resuming restricting the HLOS's I/O accesses. In yet another aspect, means for implementing second stage translations may include means for monitoring for an attempt by the HLOS to allocate memory and means for providing to the HLOS one or more physical addresses in a physical address space accessible to the HLOS when the HLOS attempts to allocate memory. In another aspect, the computing device may also include means for determining whether a sandboxed component is attempting to allocate memory when the HLOS attempts to allocate memory and means for providing physical addresses to the sandboxed component from the physical addresses in a physical address space when it is determined that the sandboxed component is attempting to allocate memory. In yet another aspect, means for providing the physical addresses to the sandboxed component may include means for removing the physical addresses to be provided to the sandboxed component from the physical addresses in the physical address space that are accessible to the HLOS and means for providing the physical addresses to the sandboxed component from available physical addresses in the physical address space.

In further aspects, a non-transitory processor-readable storage medium may have stored thereon processor-executable software instructions configured to cause a processor to perform operations for managing memory on a computing device, the operations including initializing a hypervisor, a security monitor, and a high-level operating system (HLOS); disabling the hypervisor after initialization; monitoring for a signal from the security monitor to start a sandbox session; enabling the hypervisor when the signal is received to start the sandbox session; and implementing access control while the hypervisor is enabled. In another aspect, the security monitor may be an ARM TrustZone®. In another aspect, the stored processor-executable software instructions may be configured to cause a processor to perform operations such that the hypervisor may be disabled or enabled across at least one of an integrated circuit boundary and a chip boundary.

In an aspect, the stored processor-executable software instructions may be configured to cause a processor to perform operations such that initializing the hypervisor includes configuring the HLOS to allocate memory space such that each intermediate physical address in the HLOS's intermediate physical address space is equal to a corresponding physical address in a physical address space. In another aspect, the stored processor-executable software instructions may be configured to cause a processor to perform operations such that initializing the hypervisor includes authenticating the hypervisor's code and data with the security monitor. In another aspect, the stored processor-executable software instructions may be configured to cause a processor to perform operations that includes configuring the hypervisor's code and data to be inaccessible to at least one of a digital signal processor and a CPU included in the digital signal processor while the hypervisor is enabled.

In an aspect, the stored processor-executable software instructions may be configured to cause a processor to perform operations such that disabling the hypervisor includes configuring all system memory management units (SMMU) context banks to bypass second stage translation and turning off second stage translations for the HLOS. In another aspect, the stored processor-executable software instructions may be configured to cause a processor to perform operations such that disabling the hypervisor further includes at least one of suspending restricting the HLOS's accesses to hardware interrupts, suspending restricting the HLOS's accesses to hardware timers, and suspending restricting the HLOS's I/O accesses.

In an aspect, the stored processor-executable software instructions may be configured to cause a processor to perform operations that include determining whether the sandbox session is over, performing a sandbox session tear-down procedure when it is determined that the sandbox session is over, and disabling the hypervisor after performing the sandbox session tear-down procedure. In an aspect, the stored processor-executable software instructions may be configured to cause a processor to perform operations such that determining whether the sandbox session is over includes receiving another signal indicating that the sandbox session is over. In another aspect, the stored processor-executable software instructions may be configured to cause a processor to perform operations such that performing the sandbox session tear-down procedure includes freeing all buffers for a sandboxed component and restoring second stage translation page tables to remove all fragmentations.

In an aspect, the stored processor-executable software instructions may be configured to cause a processor to perform operations such that enabling the hypervisor includes enabling PL0 and PL1 second stage memory management units, configuring interrupt requests to be taken in hypervisor mode, and calling SMMU drivers to put all active SMMU context banks in first stage translations nested within second stage translations. In another aspect, the stored processor-executable software instructions may be configured to cause a processor to perform operations that include starting inter-processor communications with a digital signal processor. In another aspect, the stored processor-executable software instructions may be configured to cause a processor to perform operations that include handling SMMU faults.

In an aspect, the stored processor-executable software instructions may be configured to cause a processor to perform operations such that implementing access control includes implementing second stage translations. In another aspect, the stored processor-executable software instructions may be configured to cause a processor to perform operations such that implementing access control further includes at least one of resuming restricting the HLOS's accesses to hardware interrupts, resuming restricting the HLOS's accesses to hardware timers, and resuming restricting the HLOS's I/O accesses. In another aspect, the stored processor-executable software instructions may be configured to cause a processor to perform operations such that implementing second stage translations includes monitoring for an attempt by the HLOS to allocate memory and providing to the HLOS one or more physical addresses in a physical address space accessible to the HLOS when the HLOS attempts to allocate memory. In yet another aspect, the stored processor-executable software instructions may be configured to cause a processor to perform operations that include determining whether a sandboxed component is attempting to allocate memory when the HLOS attempts to allocate memory and providing physical addresses to the sandboxed component from the physical addresses in a physical address space when it is determined that the sandboxed component is attempting to allocate memory. In another aspect, the stored processor-executable software instructions may be configured to cause a processor to perform operations such that providing the physical addresses to the sandboxed component includes removing the physical addresses to be provided to the sandboxed component from the physical addresses in the physical address space that are accessible to the HLOS and providing the physical addresses to the sandboxed component from available physical addresses in the physical address space.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
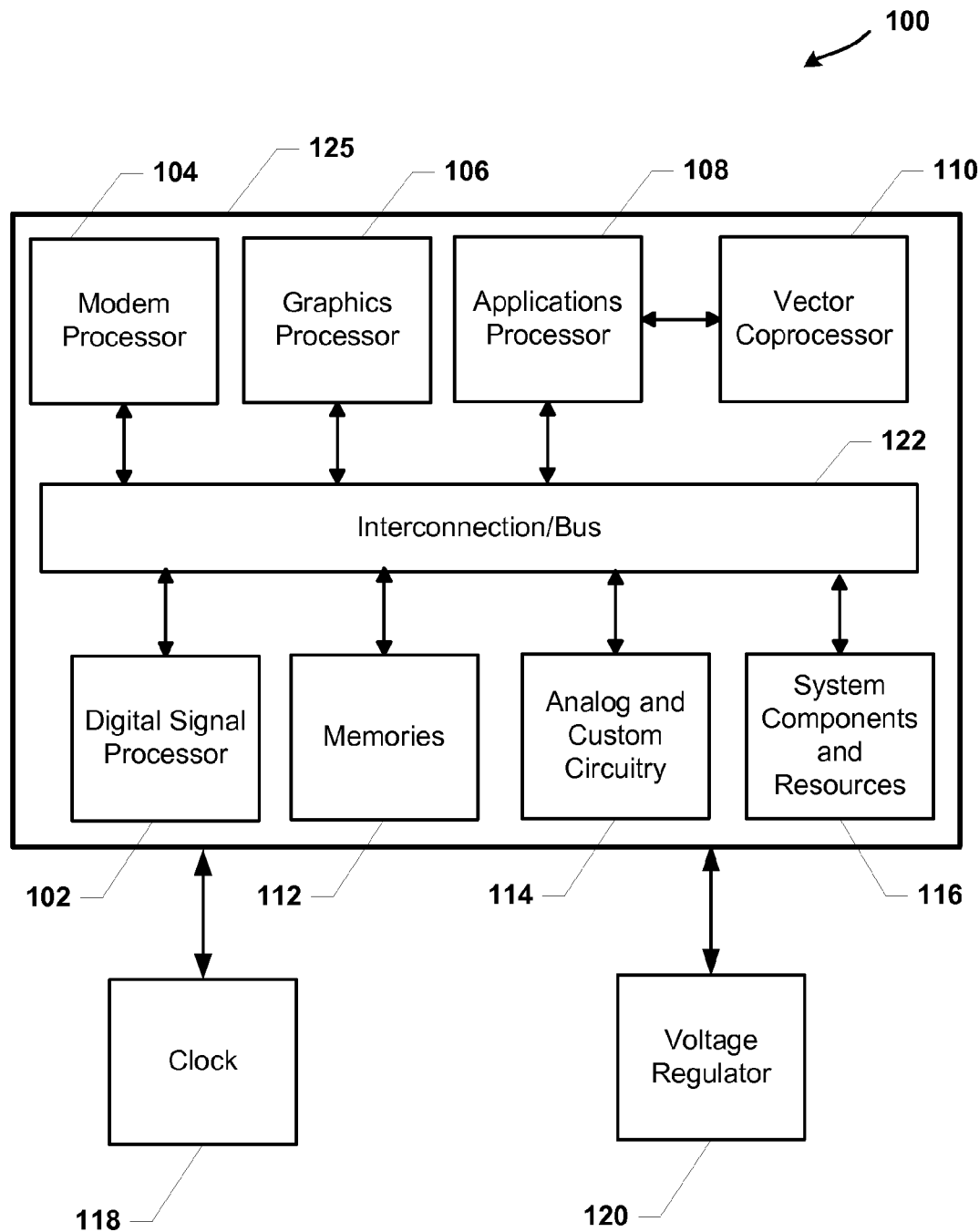
FIG. 1 is a component block diagram of an aspect computing device.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include a computing device and methods for selectively implementing a hypervisor on the computing device to efficiently enforce access control with a hypervisor. In the various aspects, the hypervisor is normally disabled and is enabled when a condition is detected that would require the hypervisor to implement access control (i.e., a "sandbox session"). While disabled, the hypervisor may not perform second stage translations, but, while enabled, the hypervisor may resume second stage translations. In some aspects, while enabled, the hypervisor may also resume other activities that are suspended while the hypervisor is disabled, including restricting input/output (I/O) accesses, hardware interrupt accesses, and/or hardware timer accesses. Thus, by selectively enabling the hypervisor only while sandboxing is needed, the computing device may improve overall performance and user experience while maintaining a secure operating environment.

In the various aspects, the computing device may include memory and a processor coupled to the memory that is configured with a hypervisor, implemented in hardware (i.e., a bare metal hypervisor), in software (i.e., a hosted hypervisor operating within a conventional operating system environment), or in a combination of hardware and software. The hypervisor may additionally create and manage one or more virtual machines for various applications, operating systems, processes, signals, etc.

The term "computing device" is used herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and a memory, and operate under battery power such that power conservation methods are of benefit. While the various aspects are particularly useful in mobile devices, such as cellular telephones, which have limited processing power and battery capacity, the aspects are generally useful in any computing device that may benefit from improved processor performance and reduced energy consumption.

The terms "virtual machine monitor," "VMM," and "hypervisor" are used interchangeably herein to refer to a virtual machine manager. The term "high-level operating system" (HLOS) is used herein to refer to a guest operating system operating in a virtual machine that the hypervisor manages. In an aspect, the hypervisor may segregate the HLOS during a sandbox session.

The terms "Stage 1 translation" and "first stage translation" are used interchangeably herein to refer to a translation or mapping from a virtual memory address (a "VA") to an intermediate memory address (an "IPA"). In an example, the HLOS may perform a first stage translation from virtual addresses allocated to a process operating on the HLOS to intermediate physical addresses maintained in the HLOS's intermediate physical address space.

The terms "Stage 2 translation" and "second stage translation" are used interchangeably herein to refer to a translation or mapping from an intermediate physical address to a physical memory address (an "PA"). In an example, the hypervisor or a system memory management unit (a "SMMU") may perform a second stage translation from intermediate physical addresses allocated to the HLOS to physical addresses maintained by the hypervisor in the physical address space.

The term "sandbox session" is used herein to refer to a period of time in which the hypervisor is performing access control between two or more entities. In an aspect, a sandbox session may begin when the hypervisor is alerted to protected content (e.g., content protected by digital rights management (DRM) techniques) that must be separately processed on the computing device (e.g., a secure video device for playing DRM media) and may end when that separation is no longer necessary, such as when the protected content has finished being processed or played and the service or application has been released.

The term "sandboxed component" is used herein to refer to a component, application, process, etc. that the hypervisor separates (i.e., sandboxes) from the HLOS. In an aspect, the hypervisor may allocate physical addresses in the physical memory address space for the sandboxed component that do not overlap with the physical addresses allocated to the HLOS.

The term "sharing entity" is used herein to refer to a component, application, process, etc. that shares virtual memory with the HLOS. In an aspect, the sharing entity and the HLOS may share access to one or more physical addresses in the physical memory address space.

By creating and managing virtual machines, the hypervisor may create a "sandbox" or secured separation around various operations or data, including operating systems, applications, processes, etc. The hypervisor may use a sandbox to limit access to various features, thereby providing security for the operations or data. For example, a HLOS may operate as a guest operating system within a virtual machine that the hypervisor manages, and the hypervisor may manage a video signal processed outside of the HLOS's virtual machine such that the HLOS may be oblivious to (i.e., unable to detect or access) the video signal.

However, there is a performance cost associated with using the hypervisor to enforce access control. Benchmark testing has shown that using the hypervisor to enforce access control may cause an approximately 5% to 30% drop in performance depending on the benchmark. The various aspects overcome this performance penalty by implementing the hypervisor only when there is a need for data and/or software security afforded by a sandbox.

In the various aspects, an HLOS may operate in a virtual machine managed by the hypervisor. The HLOS may maintain an intermediate physical address page table for use in allocating virtual address to various processes or applications running on the HLOS. The HLOS may allocate memory directly from the physical memory address space, thereby ensuring that the intermediate physical addresses are always the same as the physical addresses. In other words, the intermediate physical addresses in the HLOS's intermediate physical address space are equal to the physical addresses in the physical address space at all times. By ensuring that the HLOS can allocate memory such that intermediate physical addresses are equal to physical addresses at all times, the various aspects enable the hypervisor to be selectively enabled and disabled, thereby improving overall performance since the performance hit of the hypervisor is only incurred when a sandbox session is required.

In the various aspects, the HLOS may allocate memory directly from the physical memory address space. However, while the hypervisor is enabled, the hypervisor may restrict the HLOS's access to the physical memory address space, thereby allowing the HLOS to allocate memory from only a portion of the physical memory address space.

In an aspect, the computing device processor may monitor for situations in which sandboxing is required (i.e., data and/or software that should be processed in a sandbox session). In an aspect, a sandbox session may be a situation or period of time in which sandboxing is needed to enforce access control between separate processes, applications, etc. For example, the computing device may detect that a secure signal has been received (e.g., a video signal subject to digital rights management) or that a second operating system is being initiated that must be kept isolated from the HLOS. When the need for a sandbox session is detected, the computing device may enable the hypervisor. After being enabled, the hypervisor may implement second stage translations and limit the HLOS to allocating memory from only a portion of the physical memory address space, thereby establishing the sandbox session. The hypervisor, while enabled, may also resume other access control operations, such as restricting one or more of I/O accesses, hardware interrupt accesses, and hardware timer accesses.

In another aspect, the hypervisor may monitor for the end of a sandbox session, e.g., the hypervisor may determine whether the secure video signal is no longer being received. When the sandbox session has ended, the hypervisor may perform a session teardown. In the session teardown process, the hypervisor may free the resources allocated to sandboxed component. For example, the hypervisor may free resources allocated to a digital signal processor to process the secure video signal, thereby allowing the HLOS to allocate memory from the entire physical memory address space. In a further aspect, the hypervisor may be disabled until the next sandboxing situation begins.

In yet another aspect, the hypervisor may enable second stage translations for the HLOS and a sharing entity. In this aspect, the sharing entity and the HLOS may share virtual memory and share access to physical addresses in the physical memory address space. In a further aspect, the hypervisor may perform access control between the HLOS and the sharing entity for the memory addresses that are not shared.

The various aspects may be implemented on a wide variety of single and multi-processor computer architectures, an example of which is illustrated in FIG. 1. A computing device 100 may include a number of heterogeneous processors, such as the illustrated digital signal processor (DSP) 102, modem processor 104, graphics processor 106, and application processor 108. The computing device 100 may also include one or more vector coprocessors 110 connected to one or more of the processors 102-108. Each processor 102-110 may include one or more cores, and each processor/core may perform operations independent of the other processors/cores. Each processor 102-110 may also include a memory (not illustrated) and/or a memory management system controller. In an aspect, the computing device 100 components may be located on a single substrate and/or closely coupled together as a system-on-chip (SOC) 125.

The computing device 100 may include analog circuitry and custom circuitry 114 for managing sensor data, analog-to-digital conversions, wireless data transmissions, and performing other specialized operations, such as processing encoded audio signals for games and movies. The computing device 100 may further include system components and resources 116, such as voltage regulators, oscillators, phase-locked loops, peripheral bridges, data controllers, memory controllers, system controllers, access ports, timers, and other similar components used to support the processors, memories, and clients running on a computing device. Each of system components/resources 116 may further include a memory (not illustrated) and/or a memory management system controller.

In various aspects, the applications processor 108 may be a central processing unit (CPU), a component of a CPU, or a processing unit coupled to a CPU. In an aspect, the CPU may be configured to read and write information to and from the various memories of the processors 102-110, system components/resources 116 and/or peripherals, which may be achieved via the memory management system controllers of the respective processors 102-110, resources 116, and/or peripherals.

The computing device 100 may further include an input/output module (not illustrated) for communications between components and resources, such as a clock 118 and a voltage regulator 120. The processors 102-108 may be interconnected to one or more memory elements 112, resources 116, custom circuitry 114, and various other system components via an interconnection/bus module 122.

As mentioned above, the computing device 100 may include one or more vector coprocessors 110 connected to one or more of the processors 102-108. Such vector coprocessors 110 may be particularly useful for processing applications that require fast and parallel execution, such as multimedia and video streaming applications. In an aspect, the vector coprocessor 110 may implement a single instruction multiple data (SIMD) instruction set architecture (ISA) that includes independent hardware registers, memory, and/or execution hardware. The SIMD vector coprocessor may be a part of, or closely coupled to, the main processor of the computing device 100 (e.g., applications processor 108, CPU, etc.).

Figure 2:
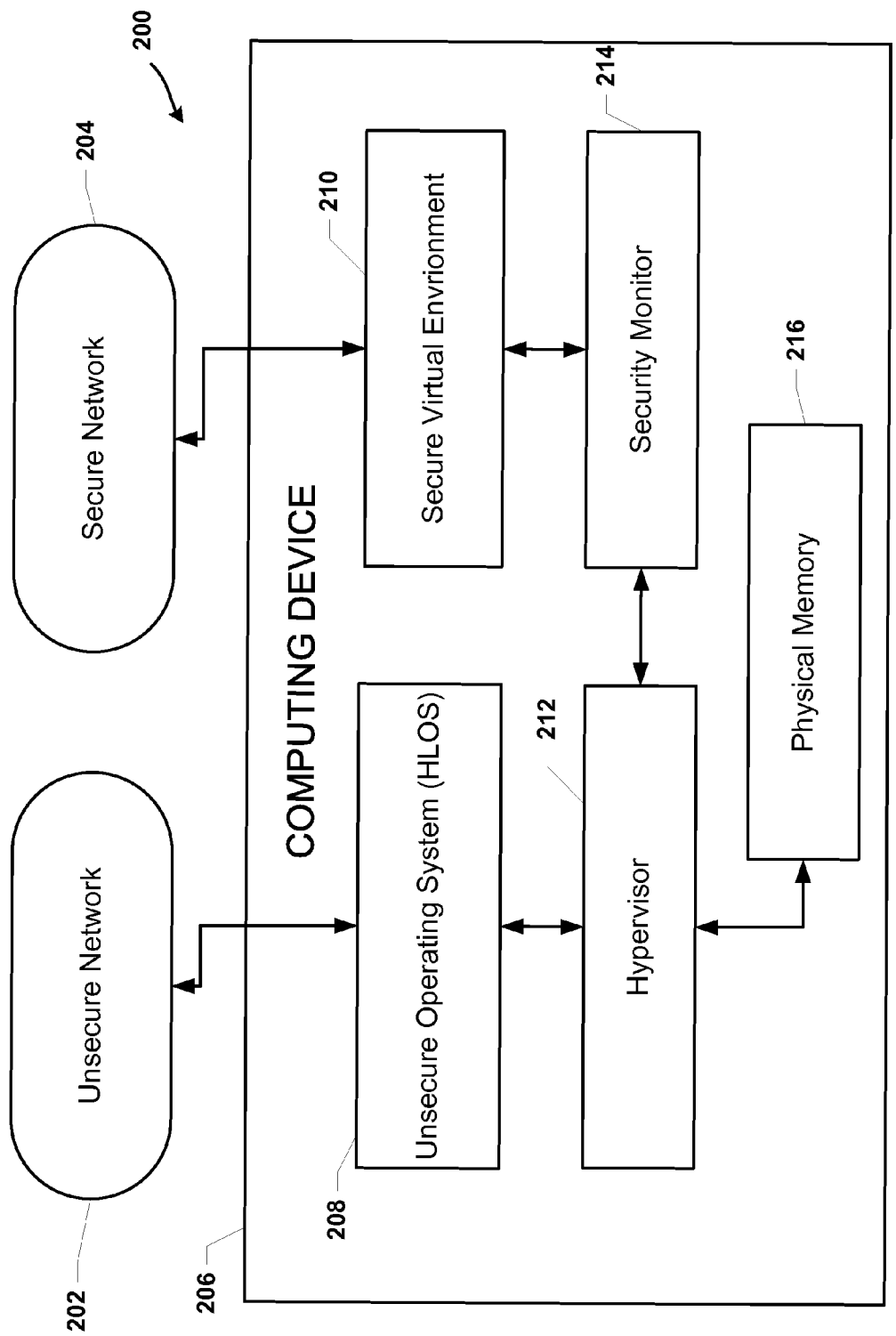
FIG. 2 is a functional block diagram of modules of a computing device.

FIG. 2 illustrates a component diagram of an aspect computing device 206 capable of maintaining a secured virtual environment (i.e., a sandbox). The unsecure operating system 208 (i.e., the HLOS) may be in communication with a hypervisor 212. The hypervisor may be in communication with physical memory 216. In an aspect, the hypervisor may act as an intermediary between the unsecure operating system 208 and the physical memory 216 or other hardware (not shown). In another aspect, the hypervisor 212 may facilitate the mapping of intermediate physical addresses (IPA) maintained by the unsecure operating system 208 to physical addresses (PA) in the physical memory 216.

In an aspect, the hypervisor 212 may also be in communication with a security monitor 214 (e.g., an ARM Trust-Zone®). The security monitor 214 may act as a gatekeeper, ensuring only secure data enters and exits the secure virtual environment 210. The secure virtual environment 210 may in turn be in communication with a secure network 204. The secure virtual environment 210 may transmit to or receive data from the secure network 204. In an example, the secure virtual environment 210 may include a digital signal processor (i.e., a DSP) that may receive sensitive data from the secure network 204. In this example, the sensitive data may be a signal containing video data regulated by digital rights management limitations. In an aspect, the security monitor 214 may communicate with the hypervisor 212 to ensure that the sensitive data is stored in a portion of the physical memory 216 that is inaccessible to the unsecure operating system (or other systems or processes). In a further aspect, this sensitive data may be stored in encrypted memory (not shown) within the physical memory 216.

Figure 3:
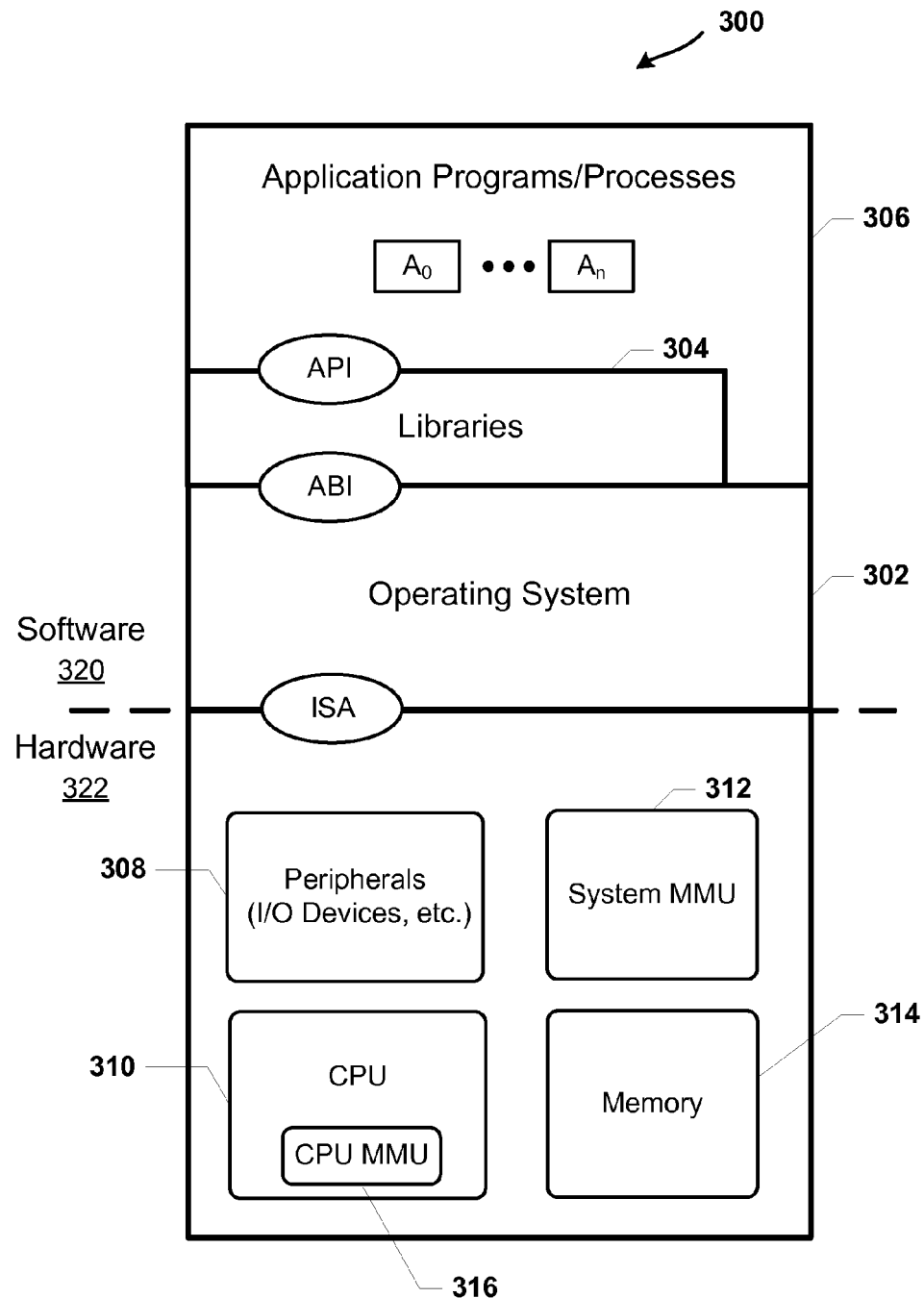
FIG. 3 is a layered computer architectural diagram of an aspect computing system.

FIG. 3 illustrates a layered architecture of a processor showing logical components and interfaces in a typical computer system. The illustrated computer system architecture 300 includes both hardware components 322 and software components 320. The software components 320 may include an operating system 302, a library module 304, and one or more application programs ($A_0$ through $A_n$) 306. The hardware components 322 may include peripherals 308 (e.g., hardware accelerators, input/output devices, etc.), a central processing unit (CPU) 310, a central processing unit memory management unit (CPU MMU) 316, one or more system memory management units (herein "system MMU" or "SMMU") 312, and one or more memories 314.

Application software written for mobile computing devices may be compiled into executable code, which is what is commonly referred to as "applications," "apps," or application programs 306. Each application program 306 may be a single process or thread, or may include a plurality of processes or threads.

Application programs 306 may issue high-level language (HLL) library calls to the library module 304 via an application program interface (API). The library module 304 may invoke services (e.g., via operating system calls) on the operating system 302 via an application binary interface (ABI). The operating system 302 may communicate with the hardware components using a specific instruction set architecture (ISA), which is a listing of specific operation codes (opcode) and native commands implemented by the hardware 322. In this manner, the instruction set architecture may define the hardware 322 as seen by the operating system 302.

The operating system 302 may be responsible for coordinating and controlling the allocation and use of the various memories 314 amongst the application programs 306, which may include partitioning the physical memory across the multiple application programs (A0-An) 306. In an aspect, the operating system 302 may include one or more memory management systems (e.g., a virtual memory manager, etc.) for managing the allocation and use of system memory by the various application programs ($A_0$ through $A_n$) 306. The memory management systems may function to ensure that the memory used by one process does not interfere with memory already in use by another process.

In an aspect, the operating system 302 may include a virtual memory manager (OS VMM) configured to perform "virtual addressing" operations that enable the operating system 302 to make a particular physical address appear to be another address (i.e., a virtual address). The virtual addressing operations may include allocating virtual memory address to the application programs ($A_0$-$A_n$) 306. Including a virtual memory manager within the operating system 302 may simplify the coordination and control of the system memory among the multiple processes or application programs ($A_0$-$A_n$) 306.

In addition to the software-based memory management systems (e.g., OS VMM, etc.) discussed above, the system may include one or more hardware-based memory management systems, such as the central processing unit (CPU) memory management unit (MMU) 316 and the system MMU 312 illustrated in FIG. 3. The CPU MMU 316 and the system MMU 312 may each include one or more hardware components responsible for performing various memory related operations, such as the translation of virtual addresses to physical addresses, cache control, bus arbitration, and memory protection. In an aspect, the CPU MMU 316 may be responsible for providing address translation services and protection functionalities to the main CPU 310, and the system MMU 312 may be responsible for providing address translation services and protection functionalities to other hardware components (e.g., digital signal processor, modem processor, graphics processor, etc.).

In various aspects, one or more of the memory management systems (e.g., system MMU 312, CPU MMU 316, etc.) may include a translation look-aside buffer (TLB), which is a cache memory that may be used for memory address translations (e.g., translating virtual addresses to physical addresses, etc.). In an aspect, the translation look-aside buffer (TLB) may be a content-addressable memory (CAM), which may be a hardware associative array memory in which stored information is organized into key-value format (e.g., hash table). The keys may be virtual addresses and the values may be physical addresses. In various aspects, the translation look-aside buffer may be hardware-managed, software managed, or managed by a combination of hardware and software. With a hardware-managed translation look-aside buffer, the format of the translation look-aside buffer entries may not be visible to software, and thus may be different for different types of central processor units.

Generally, as part of a memory address translation process, a memory management system (e.g., OS VMM, system MMU 312, CPU MMU 316, etc.) may perform a content-addressable memory search to request a physical address from the translation look-aside buffer by sending the translation look-aside buffer a virtual address as the key. If a virtual address key has a corresponding physical address value in the translation look-aside buffer (i.e., a "TLB hit" occurs), the content-addressable memory search may retrieve and return the corresponding physical address. If the requested address is not in the translation look-aside buffer (i.e., a "TLB miss" occurs), the memory address translation process may perform a page walk (e.g., a software page walk, hardware page walk, etc.) by reading the contents of multiple memory locations and computing the physical address. After the physical address is determined by the page walk, a virtual address to physical address mapping may be stored in the translation look-aside buffer.

In aspects that include a software-managed translation look-aside buffer, a TLB miss may cause the operating system to walk the page tables and perform the translation in software. In aspects that include a hardware-managed translation look-aside buffer, the memory management system may perform a hardware table walk to determine if a valid page table entry exists for a specified virtual address key.

The various aspects provide memory management systems that utilize virtualization techniques. Virtualization technologies enable the abstraction (or virtualization) of computing resources, which may be achieved by placing a control program (e.g., a Virtual Machine Monitor "VMM" or hypervisor) between the operating system and the hardware. Virtualization techniques are commonly implemented in a virtual machine (VM), which may be a software application that executes application programs like a physical hardware machine. The virtual machine provides an interface between application programs and the execution hardware, allowing application programs tied to a specific instruction set architecture to execute on hardware implementing a different instruction set architecture.

Figure 4:
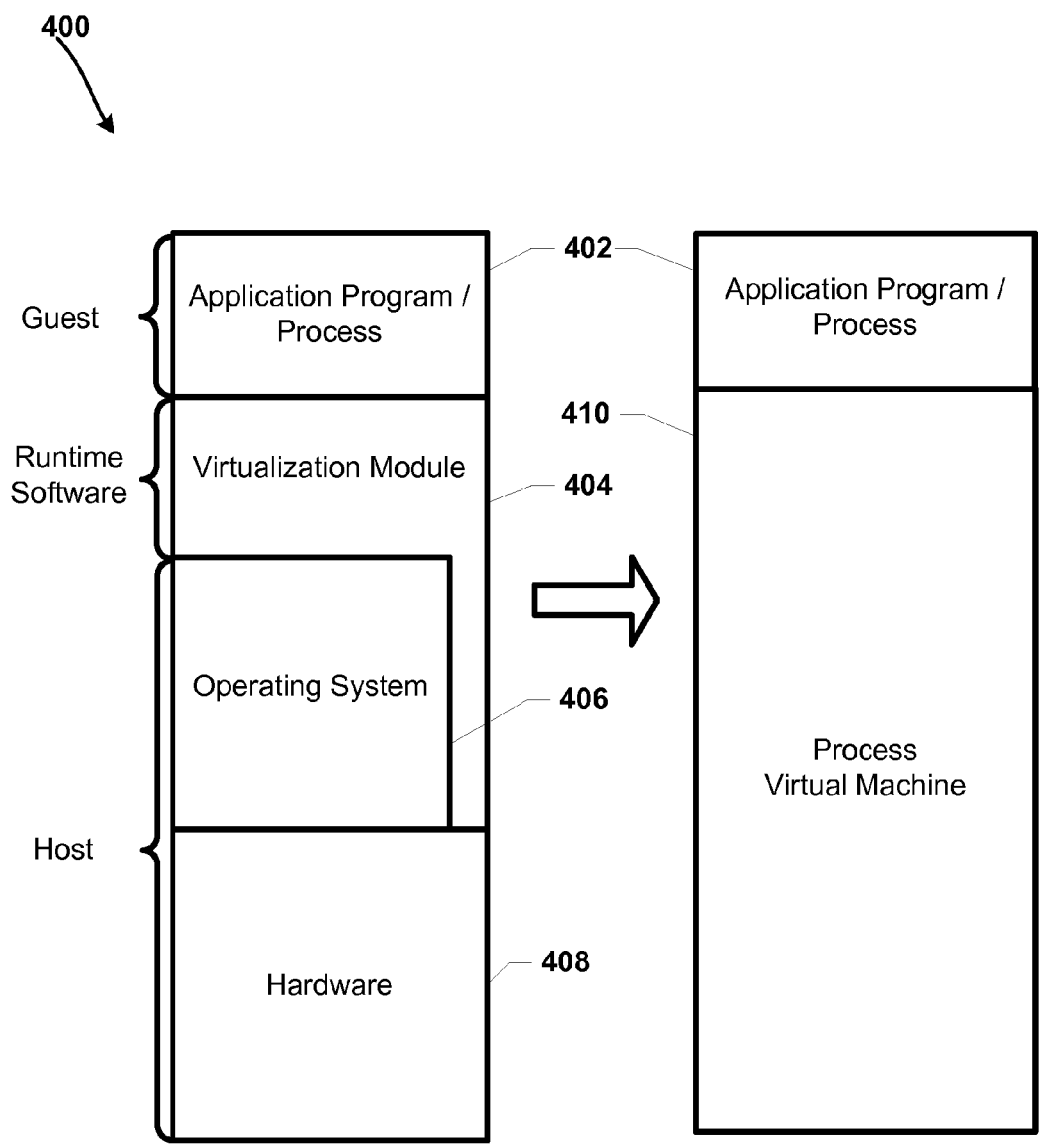
FIGS. 4 and 5 are layered computer architectural diagrams of aspect logical components in virtual machines.
Figure 5:
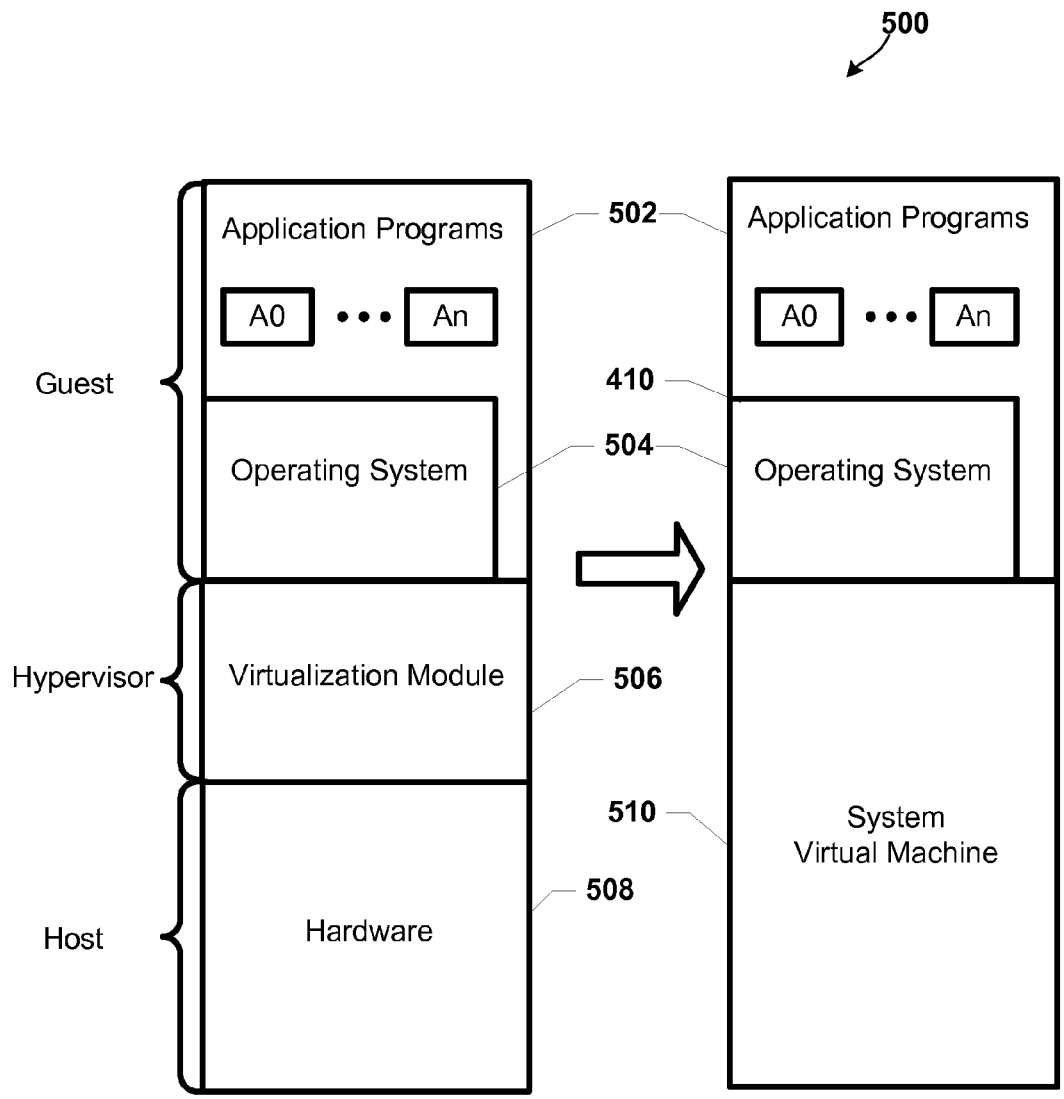

FIGS. 4 and 5 illustrate logical components in a typical computer system implementing a virtual machine. Virtual machines may be categorized into two general categories: system virtual machines; and process virtual machines. System virtual machines allow the sharing of the underlying physical hardware between different processes or applications. Process virtual machines, on the other hand, support a single process or application.

FIG. 4 is a layered architectural diagram illustrating logical layers of a computing device 400 implementing a process virtual machine 410. The computer system 400 may include hardware 408 and software components that include an application process module 402, a virtualization module 404, and an operating system 406.

As discussed above with reference to FIG. 3, hardware components are only visible to the application programs 306 through the operating system 302, and the ABI and API effectively define the hardware features available to the application programs 306. The virtualization software module 404 may perform logical operations at the ABI/API level and/or emulate operating system calls or library calls such that the application process 402 communicates with the virtualization software module 404 in the same manner it would otherwise communicate with hardware components (i.e., via system/library calls). In this manner, the application process 402 views the combination of the virtualization module 404, operating system 406, and hardware 408 as a single machine, such as the process virtual machine 410 illustrated in FIG. 4. This simplifies the job of the application developer since application software need not be concerned with the actual architecture of computing devices on which the application will ultimately execute.

The process virtual machine 410 exists solely to support a single application process 402, and is therefore created with the process 402 and terminated when the process 402 finishes execution. The process 402 that runs on the virtual machine 410 is called the "guest" and the underlying platform is called the "host." Virtualization software 404 that implements the process virtual machine is typically called runtime software (or simply "runtime").

FIG. 5 is a layered architectural diagram illustrating the logical layers in a computing device 500 implementing a system virtual machine 510. The computer system may include hardware components (e.g., execution hardware, memory, I/O devices, etc.) 508 and software components that include an application programs module 502, an operating system 504, and a virtualization module 506. Software that runs on top of the virtualization module 506 is referred to as "guest" software and the underlying platform that supports the virtualization module is referred to as "host" hardware.

Unlike process virtual machines, a system virtual machine 510 provides a complete environment on which the multiple operating systems (called "guest operating systems") can coexist. Likewise, the host hardware platform may be configured to simultaneously support multiple, isolated guest operating system environments. The isolation between the concurrently executing operating systems adds a level of security to the system. For example, if security on one guest operating system is breached, or if one guest operating system suffers a failure, the software running on other guest systems is not affected by the breach/failure. The host hardware platform also simplifies the job of the application developer since application software need not be concerned with the actual architecture of computing devices on which the application will ultimately execute.

The virtualization software module 506 may be logically situated between the host hardware and the guest software. The virtualization software may run on the actual hardware (native) or on top of an operating system (hosted), and is typically referred to as a "hypervisor" or virtual machine monitor (VMM). In native configurations, the virtualization software runs on the actual hardware in the highest privilege mode available, and the guest operating systems run with reduced privileges such that the virtualization software can intercept and emulate all guest operating system actions that would normally access or manipulate the hardware resources. In hosted configurations, the virtualization software runs on top of an existing host operating system, and may rely on the host operating system to provide device drivers and other lower-level services. In either case, each of the guest operating systems (e.g., operating system 504) communicates with the virtualization software module 506 in the same manner they would communicate with the physical hardware 508, viewing the combination of the virtualization module 506 and hardware 508 as a single, virtual machine 510. This allows each guest operating system (e.g., operating system 504) to operate under the illusion of having exclusive access to processors, peripherals, I/O, MMUs, and memories in the hardware 508.

As discussed above with reference to FIG. 3, an operating system may be responsible for partitioning the physical memory across multiple processes. This may be achieved via a memory address space translation process. In a memory address space translation process the operating system assigns virtual addresses to each application program, and then allocates the physical addresses based on the virtual addresses before the program's execution. However, in systems that include a guest operating system running on top of a virtual machine, the memory addresses allocated by the guest operating system are not the true physical addresses, but intermediate physical addresses. In such systems, the actual allocation of the physical memory is generally performed by the hypervisor, which may be required to maintain the relationships between the virtual addresses, the intermediate physical addresses, and the physical addresses.

Most processor systems only support a single stage of the memory address translation process, and require the hypervisor to manage the relationship between virtual addresses, intermediate physical addresses, and physical addresses. This is generally achieved by the hypervisor maintaining its own translation tables (called shadow translation tables), which may be derived by interpreting each of the guest operating system's translation tables. On such systems, the hypervisor ensures that all changes to the guest operating system's translation tables are reflected in the shadow structures, as well as enforce protections and redirecting access faults to the appropriate stage. As discussed above, these operations increase the complexity of the hypervisor, and add significant overheads to executing, maintaining, and/or managing the hypervisor.

Unlike the single stage processors discussed above, some processor systems (e.g., ARM v7-A) provide hardware assistance for both stages of memory translation. For example, ARM processors may include Virtualization Extensions that enable the guest operating system to translate the virtual addresses to intermediate physical addresses in a first stage (i.e., first stage translations), and for hardware to translate the intermediate physical addresses to physical addresses in a second stage (i.e., second stage translations). Such Virtualization Extensions reduce the overheads associated with executing, maintaining, and/or managing the hypervisor, and improve computing device performance.

Figure 6:
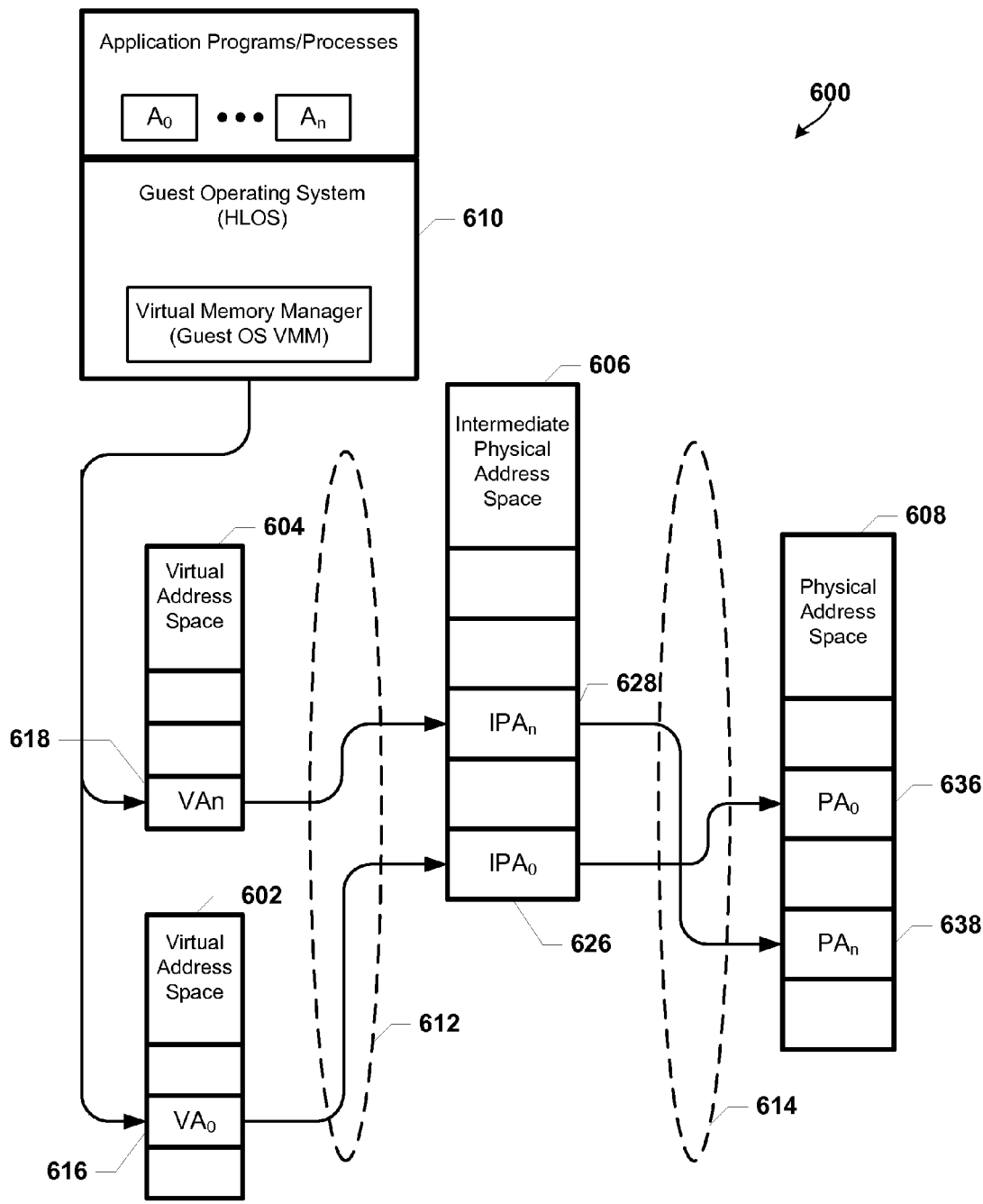
FIG. 6 is a functional block and memory map diagram illustrating two stage memory address mappings in a computing device implementing a system virtual machine.

FIG. 6 illustrates example logical components and address translations associated with allocating memory in two stages on a computing device 600 implementing a system virtual machine. A memory management system of a guest operating system 610 (e.g., HLOS) may assign a virtual address space 602, 604 to each of the application programs/processes ($A_0$, $A_n$). For example, the virtual address spaces 602, 604 may be assigned by a virtual memory manager (e.g., Guest OS VMM). Each application program/process ($A_0$, $A_n$) may be assigned its own virtual address space 602, 604, and each virtual address space 602, 604 may include one or more virtual addresses $VA_0$ 616, $VA_n$ 618.

In the example illustrated in FIG. 6, the memory addresses are translated in two stages. In a first stage translation 612, the guest operating system 610's virtual memory manager (Guest OS VMM) may map the virtual addresses $VA_0$ 616, $VA_n$ 618 to intermediate physical addresses $IPA_0$ 626, $IPA_n$ 628 in an intermediate physical address space 606. In a second stage translation 614, the hypervisor and/or virtualization extensions may map the intermediate physical addresses $IPA_0$ 626, $IPA_n$ 628 to physical addresses $PA_0$ 636, $PA_n$ 638 in a physical address space 608. The first translation stage 612 may be performed independently of the second stage translation 614, and in existing systems, the components performing the second stage translation 614 do not allocate the physical addresses based on the characteristics of the memory.

Figure 7:
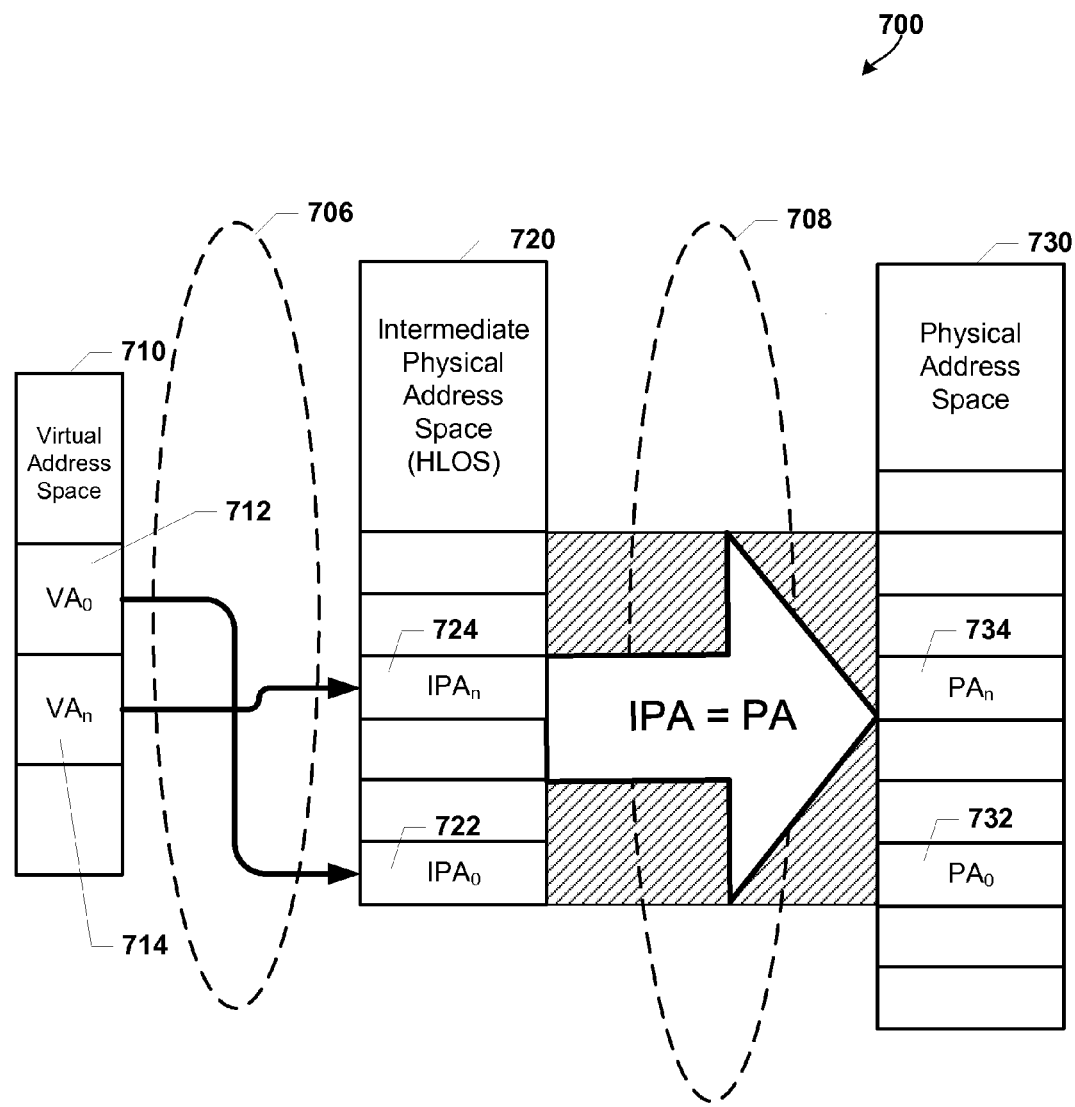
FIG. 7 is a memory map diagram illustrating two stage memory address mappings in a computing device implementing a system virtual machine while the hypervisor is disabled.

FIG. 7 illustrates example logical components and address translations associated with allocating memory in two stages on a computing device 700 implementing a system virtual machine while the hypervisor is disabled. In an aspect, while disabled, the hypervisor may not engage in second stage translations 708 until a sandbox session begins. For example, sandboxing may not be necessary when only a guest operating system (e.g., a HLOS) is executing on the computing device. Therefore, in the various aspects, the hypervisor may perform more efficiently by not engaging in second stage translations when sandboxing is determined not to be needed.

In an aspect, while the hypervisor is disabled, in a first stage translation 706, the HLOS may map virtual addresses in the virtual address space 710 to intermediate physical addresses in the HLOS's intermediate physical address space 720 as discussed above with reference to FIG. 6. For example, the HLOS may translate/map virtual addresses $VA_0$ 712 and $VA_n$ 714 to intermediate physical addresses $IPA_0$ 722 and $IPA^n$ 724, respectively. In another example, the HLOS (or a MMU operating on the HLOS) may allocate blocks of virtual memory for use by applications $A_0$ through $A_n$ by performing first stage translation 706 between the virtual address space 710 and the intermediate physical address space 720.

In a further aspect, while disabled, the hypervisor may not perform translations from the intermediate physical address space 720 to the physical address space 730 through a second stage translation 708. In this aspect, the HLOS may bypass the second stage translations 708. Thus, because the HLOS is allowed to bypass the second stage translations 708, the HLOS may allocate memory directly from the physical address space 730. By enabling the HLOS to bypass the second stage translations 708, the hypervisor ensures that intermediate physical addresses is equal to physical addresses. Thus, in an example, $IPA_n$ 724 in the intermediate physical address space 720 is equivalent to $PA_n$ 734 in the physical address space 730. Similarly, $IPA_0$ 722 in the intermediate physical address space 720 is equal to $PA_0$ 732 in the physical address space 730.

Figure 8:
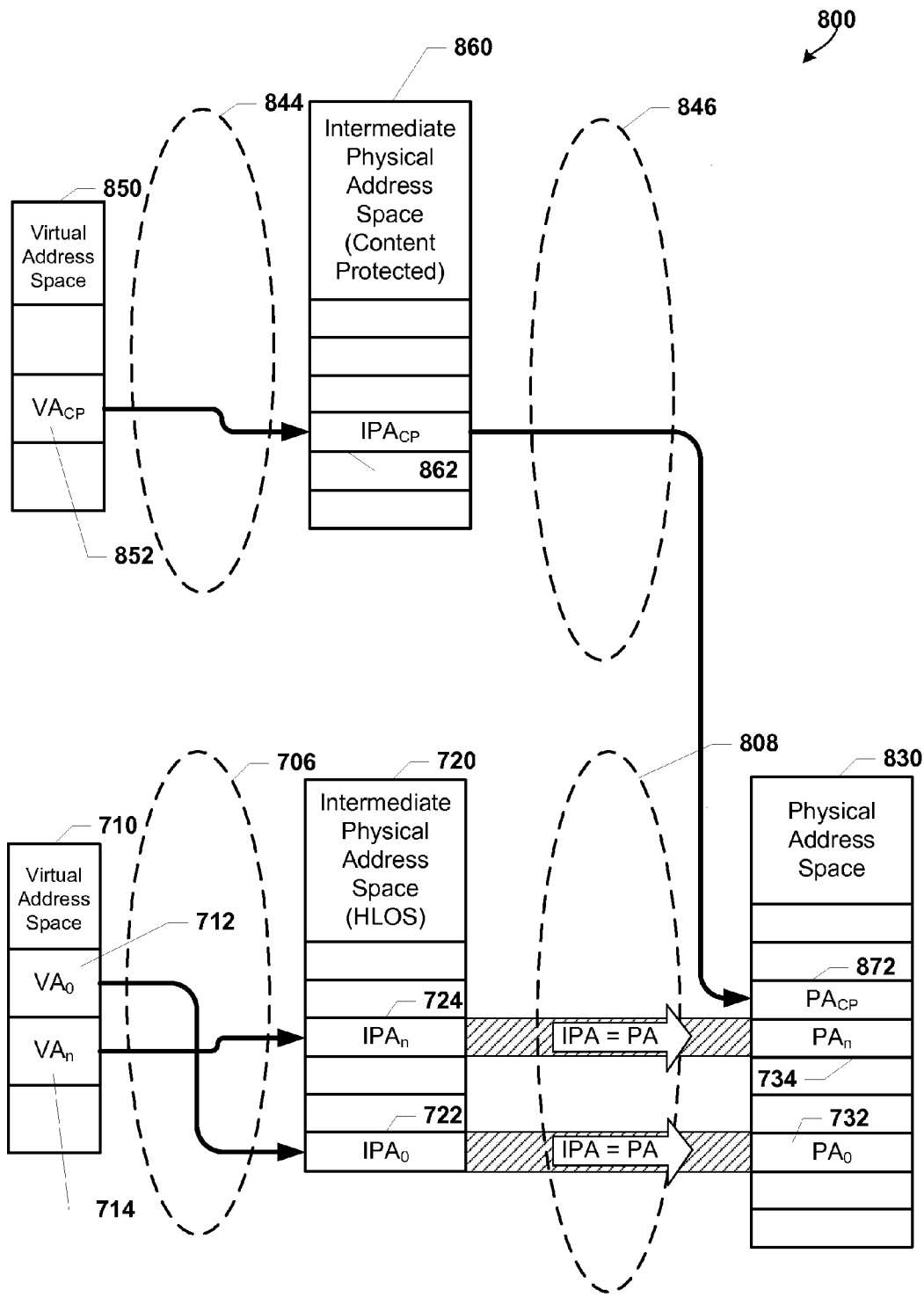
FIG. 8 is a memory map diagram illustrating two stage memory address mappings in a computing device implementing a system virtual machine while the hypervisor is enabled during a sandbox session.

FIG. 8 illustrates example logical components and address translations associated with allocating memory in two stages on a computing device 800 during a sandbox session. In the various aspects, the hypervisor may be enabled in response to detecting the start of a sandbox session.

In an aspect, a sandbox session may be a situation in which the HLOS must be isolated from protected content. Protected content may include a secure application, a second operating system running on the computing device, or anything else that may need to be processed or stored separately. For example, a digital signal processor (i.e., a "DSP") may receive a secure video signal (i.e., protected content) for processing. In this example, the secure video signal may need to be processed separately from the HLOS to maintain the video signal's integrity and/or security. In a further aspect, in response to determining that the secure video signal needs to be processed separately, a security monitor, such as an ARM Trust-Zone®, may alert the hypervisor that a sandbox session has started. In response to receiving the alert, the hypervisor may be enabled and may resume implementing second stage translations from the intermediate physical address space to the physical address space.

As illustrated in FIG. 8, once a sandbox session has started and the hypervisor is enabled, the hypervisor may resume second stage translations 808 and 846. In an aspect, protected content may be processed using both a first stage translation 844 and a second stage translation 846, similar to how the HLOS allocates memory as described above with reference to FIG. 6. For example, a secure environment (e.g., a DSP operating within a secured virtual machine) may receive a secure video signal over a connection to a secure network as discussed with reference to FIG. 2. In this example, the DSP may allocate one or more 4 kb blocks of memory (e.g., $VA_{CP}$ 852) from a virtual address space 850 to a video-processing application running on the DSP for storing a received secure video signal. The DSP may also maintain a mapping from $VA_{CP}$ 852 in the virtual address space 850 to an intermediate physical address $IPA_{CP}$ 862 in the intermediate physical address space 860 by performing a first stage translation 844.

During a sandbox session (i.e., during the secure environment's memory allocations from intermediate physical address space 860), the HLOS may also perform memory allocations. However, because the hypervisor is enabled and has resumed second stage translations 808, the HLOS no longer has an unfettered ability to allocate memory directly from the entire physical address space 830.

Thus, in an aspect, the hypervisor may restrict the physical addresses in the physical address space 830 available for allocation by the HLOS. In other words, the HLOS may still perform memory allocations directly to the physical address space 830, but the hypervisor may limit the HLOS's ability to access some portions of the physical address space 830. For example, the HLOS may allocate virtual memories $VA_0$ 712 and $VA_n$ 714, which map to $IPA_0$ 722 and $IPA_n$ 724 after a first stage translation 706, respectively, in the intermediate physical address space 720. Further, $IPA_0$ 722 and $IPA_n$ 724 may still be mapped to $PA_0$ 732 and $PA_n$ 734 as illustrated in FIG. 7, but, whereas the HLOS could allocate memory from the entire physical address space 830 as described with reference to FIG. 7 while the hypervisor is disabled (i.e., while the HLOS is capable of bypassing second stage translations 808), the HLOS may have access to a smaller set of physical addresses while the hypervisor is enabled.

While the hypervisor is enabled and performing second stage translations 808, 846, the hypervisor may allocate memory to the sandboxed component from physical addresses formerly available to the HLOS. For example, the hypervisor may map $IPA_{CP}$ 862 to $PA_{CP}$ 872, which is now no longer available to the HLOS. Thus, while enabled, the hypervisor may "puncture" the physical addresses available to the HLOS while the hypervisor is disabled by allocating memory to, for example, the sandboxed entity. In performing second stage translation 808 from the HLOS's intermediate physical address space 720 to the physical address space 830, the hypervisor may obscure the "punctured" physical addresses in the physical address space 830, thereby preventing the HLOS from accessing the "punctured" physical addresses. Thus, for example, after the hypervisor allocates $PA_{CP}$ 872 to the sandboxed component, the HLOS may no longer have access to that physical address.

By ceasing to allow the HLOS to bypass Stage 2 translation 808, the hypervisor may again manage the physical addresses to which the HLOS (and thus the sandboxed component) ultimately have access. Thus, the hypervisor may institute sandboxing by resuming, among other things, Stage 2 translations (i.e., by directly managing access to the physical memory) when there are more multiple applications, processes, operating systems, etc. that must be segregated.

Figure 9:
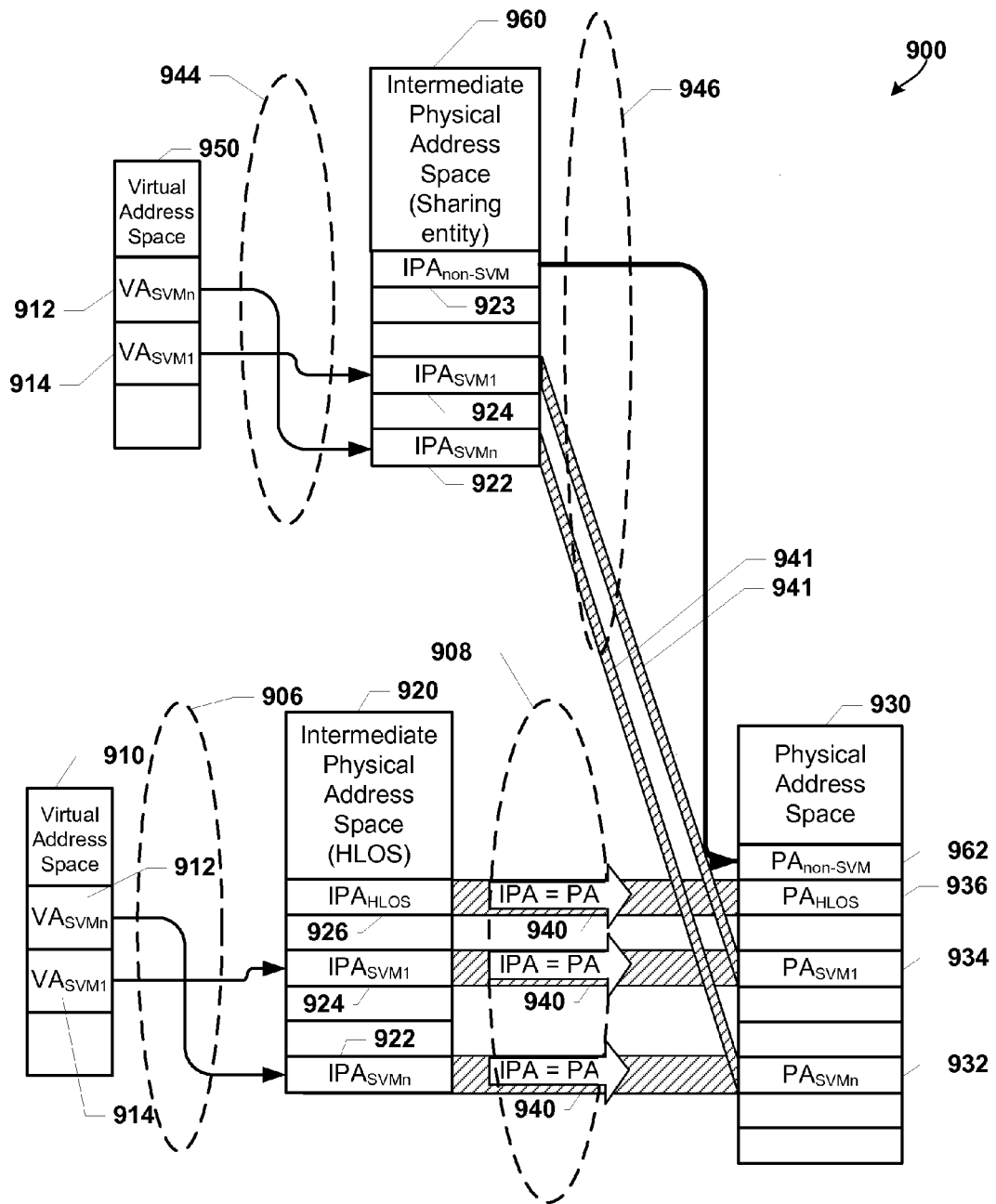
FIG. 9 is a memory map diagram illustrating two stage memory address mappings in a computing device implementing a system virtual machine with shared virtual memory while the hypervisor is enabled during a sandbox session.

FIG. 9 illustrates example logical components and address translations associated with allocating memory in two stages on a computing device 900 during a sandbox session and a shared virtual memory process. In various aspects, the hypervisor may be enabled in response to detecting the start of a sandbox session with a sharing entity (e.g., a DSP), and the HLOS and the sharing entity may share some physical addresses in the physical address space 930.

In an aspect described below with reference to FIGS. 11 and 12, the computing device may initiate a shared virtual memory session, such as between a HLOS and a digital signal processor (DSP). In a further aspect, a shared virtual memory session between the HLOS and DSP may include configuring the HLOS and DSP to share access to a set of physical addresses in the physical address space 930. For example, the HLOS and DSP may undergo a shared virtual memory session when the HLOS and DSP need to share data structures, routines, etc. By sharing direct memory accesses, the HLOS and DSP may efficiently share information without having to copy and transmit information stored in the physical address space 930.

As illustrated in FIG. 9, the HLOS and a DSP may have allocated virtual memories (i.e., $VA_{SVM1}$ 914 and $VA_{SVMn}$ 912) in respective virtual address spaces 910, 950 to applications, processes, etc. operating on the HLOS and DSP, respectively. For example, the applications operating on the HLOS and a DSP may share certain data structures, functions, or libraries. The HLOS and a DSP may perform first stage translations 906, 944, respectively, to map the virtual addresses $VA_{SVM1}$ 914 and $VA_{SVMn}$ 912 to $IPA_{SVM1}$ 924 and $IPA_{SVMn}$ 922 in each of the sharing entity's intermediate physical address space 960 and the HLOS's intermediate physical address space 920.

In another aspect, because the hypervisor is enabled in response to the start of the sandbox session, the hypervisor may activate second stage translations 908 that map intermediate physical addresses from the HLOS's intermediate physical address space 920 to the physical address space 930. The hypervisor may also activate the second stage translations 946 that map the intermediate physical addresses in the sharing entity's intermediate physical address space 960 to the physical address space 930.

In an aspect, as described with reference to FIG. 8, by enabling the second stage translations 908 from the HLOS's intermediate physical address space 920 and the physical address space 930, the hypervisor may limit the physical addresses in the physical address space 930 to which the HLOS has access (i.e., remove mappings to some physical addresses such that the HLOS may not access those physical addresses in the physical address space 930). As illustrated in FIG. 9, the hypervisor may maintain mappings 940 from $IPA_{HLOS}$ 926, $IPA_{SVM1}$ 924, and $IPA_{SVMn}$ 922 to physical addresses $PA_{HLOS}$ 936, $PA_{SVM1}$ 934, and $PA_{SVMn}$ 932, respectively, such that the mappings 940 from the HLOS's intermediate physical address space 920 to the physical address space 930 ensure that intermediate physical addresses are equal to physical addresses. Similarly, the hypervisor may maintain, among other mappings, shared mappings 941 from $IPA_{SVM1}$ 924 and $IPA_{SVMn}$ 922 in the sharing entity's intermediate physical address space 960 to $PA_{SVM1}$ 934, and $PA_{SVMn}$ 932, respectively, in the physical address space 930.

In another aspect, the hypervisor may implement "partial" sandboxing of the sharing entity. In this aspect, the hypervisor may remove mappings from the HLOS to physical addresses allocated to the sharing entity that are not shared with the HLOS (e.g., $PA_{non-SVM}$ 962). The sharing entity and the HLOS may each maintain mappings to memory in the physical address space that are not shared. For example, the DSP may maintain information associated with an $IPA_{non-SVM}$ 923 that may be, for example, the DSP's kernel. In another example, the HLOS may maintain memory at $IPA_{HLOS}$ 926 in the HLOS's intermediate physical address space 920 that is mapped to $PA_{HLOS}$ 936, which is not shared with the sharing entity.

However, the hypervisor may not remove mappings from the HLOS to physical addresses that are allocated to the sharing entity but are shared with the HLOS (e.g., $IPA_{SVM1}$ 924, and $IPA_{SVMn}$ 922). By not removing the mappings, the hypervisor may allow the HLOS and the sharing entity to share the information stored at these physical addresses, such as pointers to data structures, libraries, routines, etc.

Thus, by managing the mappings to the physical address space 930 that are removed from the second stage translations 908 from the HLOS's intermediate physical address space 920, the hypervisor may enable the HLOS and the sharing entity to share information stored at certain physical addresses and may still enforce access control of addresses that are not shared (e.g., $PA_{non-SVM}$ 962 and $PA_{HLOS}$ 936).

Figure 10:
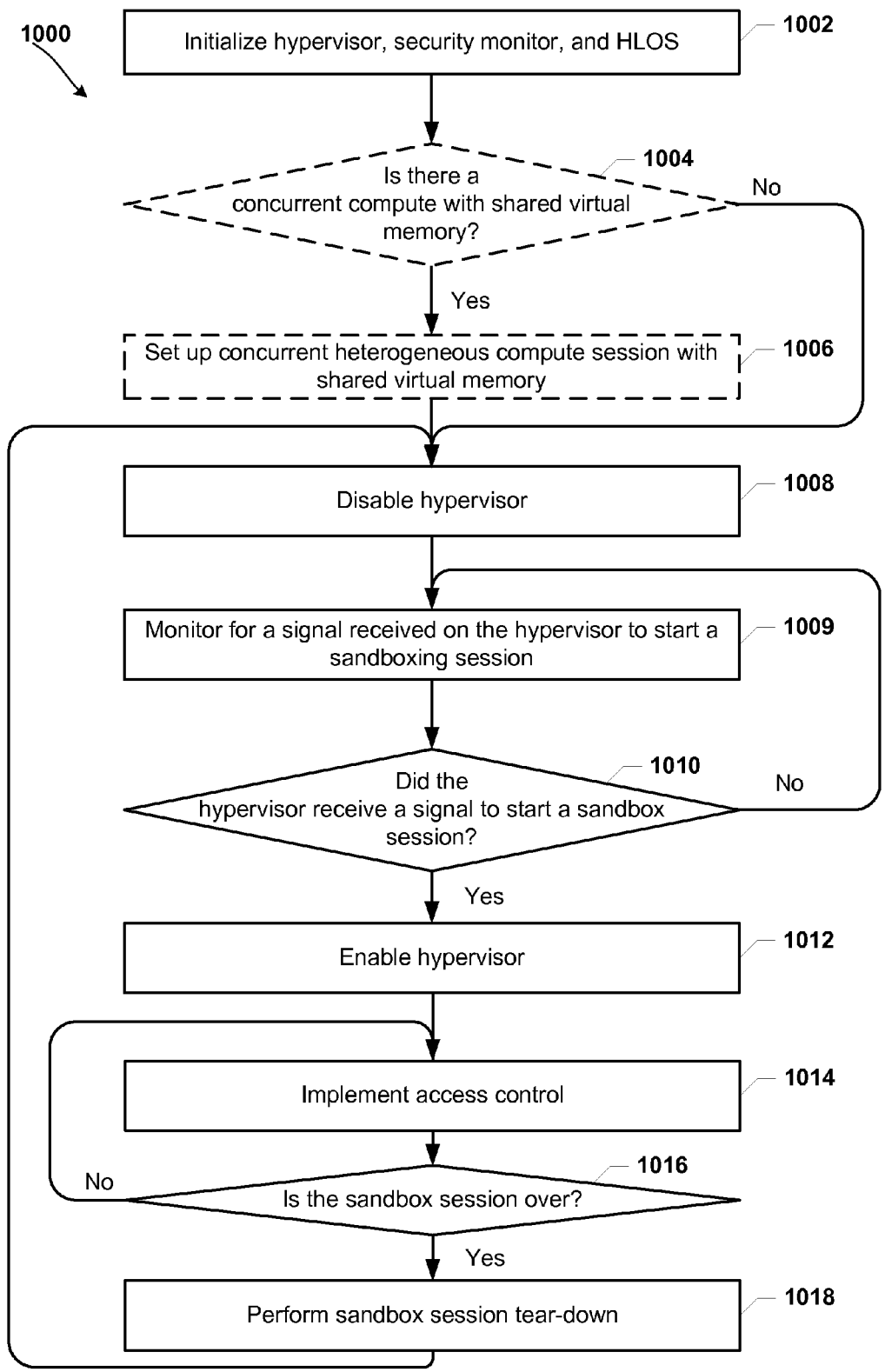
FIG. 10 is a process flow diagram illustrating an aspect method for selectively enabling and disabling a hypervisor.

FIG. 10 illustrates an aspect method 1000 that may be implemented in a computing device processor (e.g., a CPU) for selectively enabling a hypervisor during a sandbox session. In block 1002, the computing device processor may initialize the hypervisor, security monitor, and HLOS. In an aspect, the computing device processor may initialize the hypervisor, security monitor, and HLOS by booting into the hypervisor, security monitor, and HLOS using a Linaro ARMv8 secure boot flow and Xen-style grant table. In another aspect, the security monitor may be an ARM TrustZone®.

In a further aspect, the hypervisor's code and data may be authenticated and/or signed by the security monitor during initialization. During initialization, the hypervisor may also be configured such that its code and data are inaccessible to outside processors, such as a digital signal processor (DSP) or a CPU that is included in a DSP. In another aspect, authenticating the hypervisor and/or preventing outside processors from accessing the hypervisor's code and data while the hypervisor is enabled may ensure that future sandbox sessions are secure.

In optional determination block 1004, the computing device processor may determine whether there is a concurrent heterogeneous compute session with shared virtual memory. In an aspect, the HLOS and a sharing entity (e.g., a DSP) may share complex, pointer-containing data structures. If the computing device processor determines that a concurrent heterogeneous compute session with shared virtual memory situation is present (i.e., determination block 1004="Yes"), the processor may set up the concurrent heterogeneous compute session with shared virtual memory in block 1006. In an aspect, the HLOS and a DSP, for example, may be configured to share the same first stage page table. Setting up the concurrent heterogeneous compute session with shared virtual memory is discussed in detail below with reference to FIGS. 11 and 12. The computing device processor may continue operating in block 1008. If the computing device processor determines that there is no concurrent heterogeneous compute session with shared virtual memory (i.e., optional determination block 1004="No"), the processor may also continue operating in block 1008.

In block 1008, the computing device processor may disable the hypervisor. In an aspect, the hypervisor's default condition may be disabled. In another aspect, disabling the hypervisor may disable second stage translations from intermediate physical address spaces to the physical memory address space. Other consequences of disabling the hypervisor may include ceasing to restrict the HLOS's accesses to hardware interrupts, hardware timers, and input/out. Disabling the hypervisor is further discussed below with reference to FIG. 13.

In block 1009, the computing device processor may monitor for a signal received on the hypervisor to start a sandbox session. In an aspect, the security monitor (e.g., an ARM TrustZone®) may receive or detect protected content and send a wake-up signal to the hypervisor to begin a sandbox session. For example, a DSP operating within a secure virtual environment may receive a secure video signal for secure processing. In this example, the DSP may be configured to store the video signal in a portion of the physical memory address space inaccessible to the HLOS, for instance.

In determination block 1010, the computing device processor may determine whether the hypervisor received a signal to start a sandbox session. If the computing device processor determines that the hypervisor has not received a signal to start a sandbox session (i.e., determination block 1010="No"), the processor may continue operating in block 1009. In an aspect, the computing device processor may continue to monitor for a signal for the hypervisor to start a sandbox session.

If the computing device processor determines that the hypervisor did receive a signal to start a sandbox session (i.e., determination block 1010="Yes"), the processor may enable the hypervisor in block 1012. In an aspect, enabling the hypervisor may include resuming second stage translations. Enabling the hypervisor is discussed in further detail below with reference to FIGS. 14 and 15.

The hypervisor may then implement access control in block 1014. In an aspect, the hypervisor may implement access control by performing second stage translations from intermediate physical addresses to physical addresses. In a further aspect, the hypervisor may additionally implement access control by resuming restricting accesses to the I/O, hardware interrupts, and hardware timers. The process of implementing access control is described in further detail below with reference to FIGS. 16A and 16B.

In determination block 1016, the hypervisor may determine whether the sandbox session is over. For example, a sandbox session may be over when there is no content that must be secured or isolated from the HLOS or other processes, applications, or components. For instance, in the example given above, the sandbox session initiated when the DSP received a secure video signal may end after the DSP has processed the secure video signal and no longer needs to store the video signal's video buffers in physical memory. In another aspect, the security monitor or another component in the secured virtual environment may signal the hypervisor that the sandbox session is over.

If the sandbox session is not over (i.e., determination block 1016="No"), the hypervisor may continue performing the operations in block 1014. Otherwise (i.e., determination block 1016="Yes"), the hypervisor may tear down the sandbox session in block 1018. In an aspect, the hypervisor may return the HLOS and various other components of the computing device to a "default" state or configuration as a result of performing a sandbox session tear-down procedure. Sandboxing session tear-downs are described in further detail below with reference to FIG. 17. The computing device may continue performing the operations in block 1008.

Figure 11:
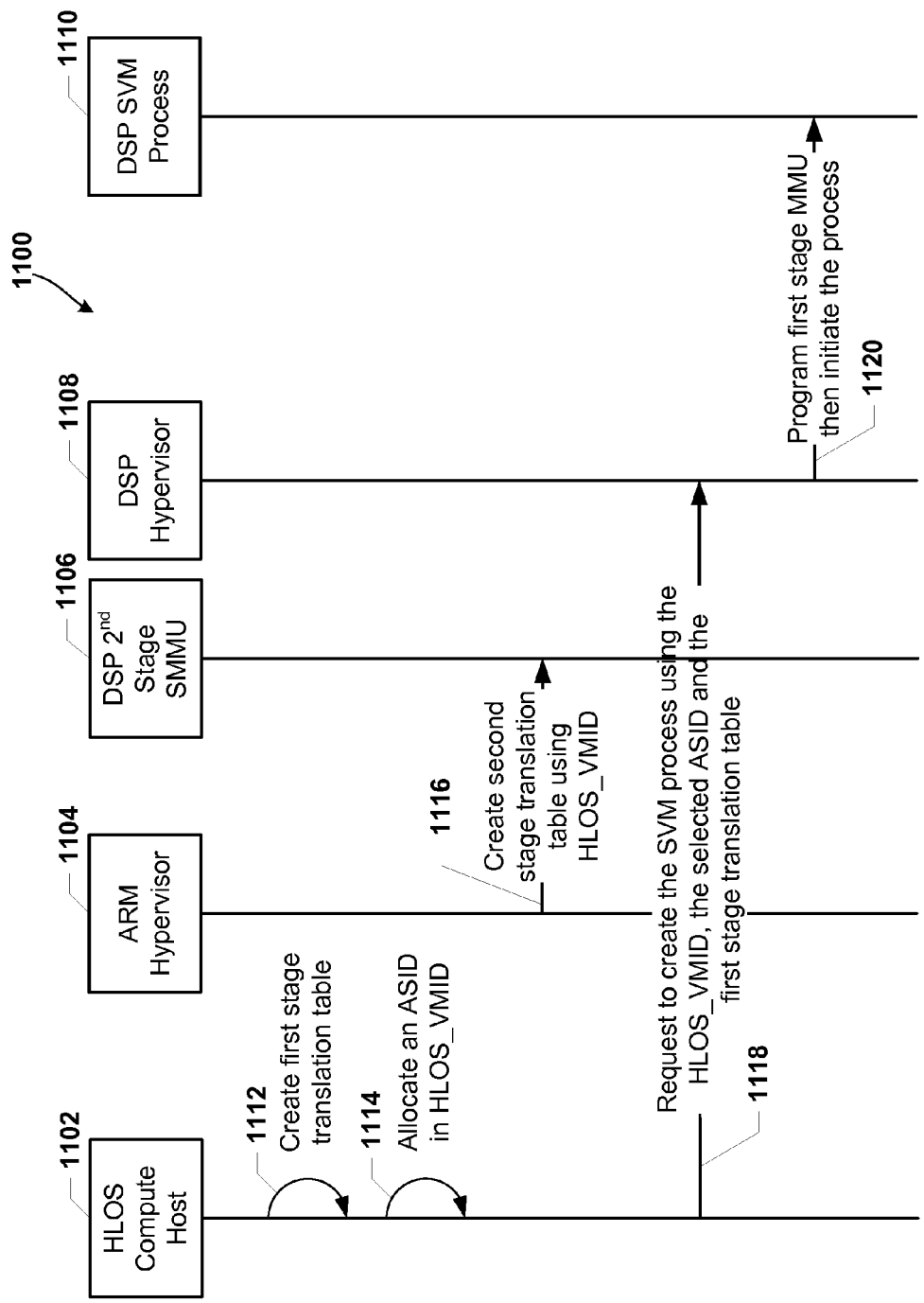
FIG. 11 is a call flow diagram illustrating signaling involved in initiating a shared virtual memory environment on a computing device.

FIG. 11 illustrates an aspect signal and call flow among various components of a computing device for initiating a concurrent heterogeneous compute session. In an aspect, in operation 1112, the HLOS 1102 may create a first stage translation table. The HLOS 1102 may also allocate an application-specific identifier (ASID) in the HLOS's virtual machine identifier (i.e., "HLOS_VMID") in operation 1114. In another aspect, the hypervisor 1104 may send a signal 1116 to a digital signal processor (DSP) second stage system memory management unit (SMMU) 1106 to create a second stage translation table using the HLOS's HLOS_VMID. In an aspect, the DSP second stage SMMU may use the second stage translation table to perform second stage translations from the HLOS's intermediate physical address space to the physical address space.

In an aspect, the HLOS may send a signal 1118 to the DSP's hypervisor 1108, requesting the creation of a shared virtual memory (SVM) process using the HLOS's HLOS_VMID, the selected application-specific identifier, and the first stage translation table. The DSP's hypervisor 1108 may initiate the DSP's shared virtual memory process 1110 with a signal 1120 that programs the first stage translation table for the DSP's memory management unit (MMU), and then initiates the DSP's shared virtual memory process 1110.

Figure 12:
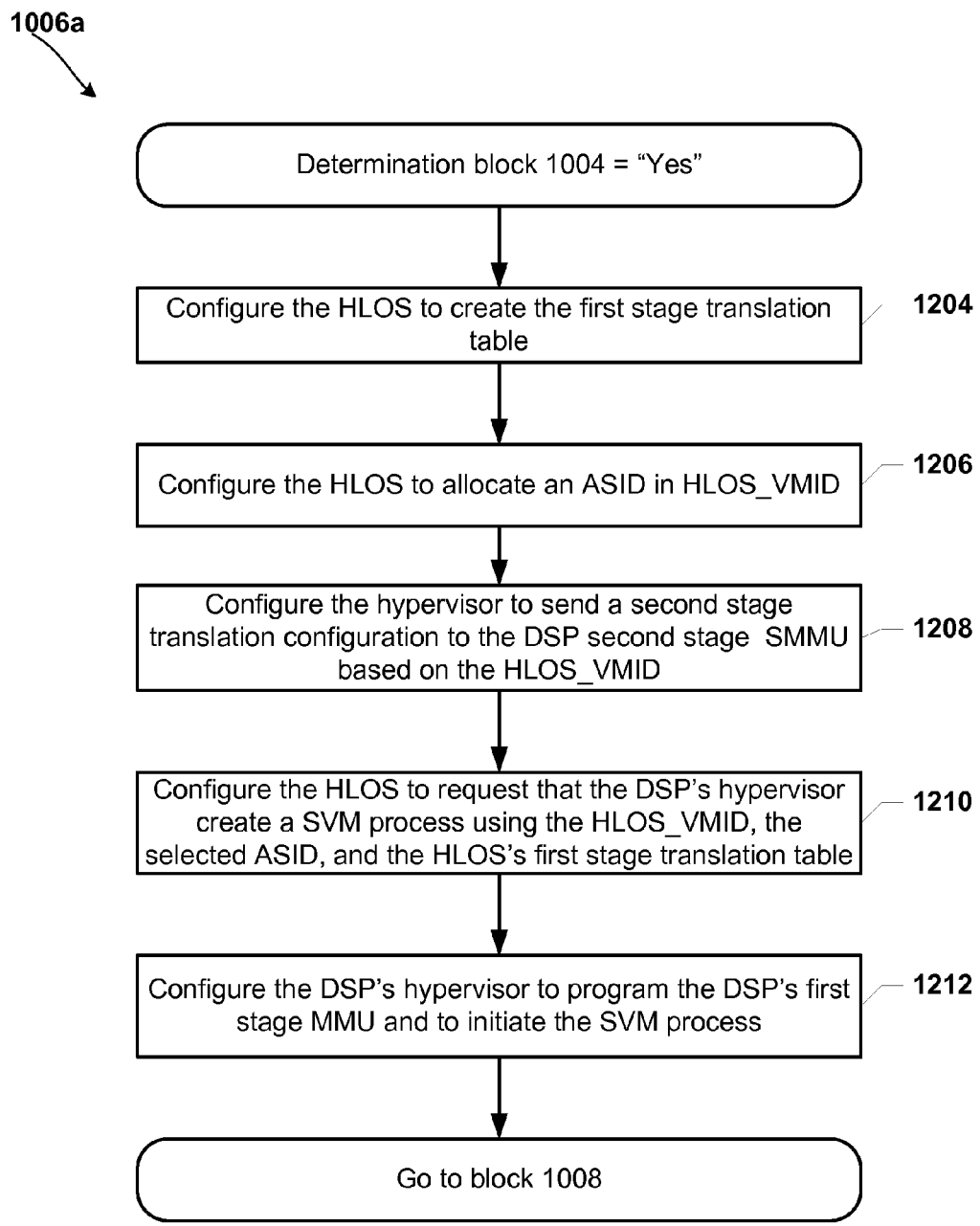
FIG. 12 is a process flow diagram illustrating an aspect method of configuring a shared virtual memory session.

FIG. 12 illustrates an aspect method 1006a that may be implemented in a computing device for initiating a shared virtual memory process between a HLOS and a DSP. The computing device processor may begin the method 1006a when the processor determines that there is a concurrent heterogeneous compute session with shared virtual memory (i.e., determination block 1004="Yes"). In block 1204, the computing device may configure the HLOS to create a first stage translation table. In an aspect, the HLOS may use the first stage translation table to map virtual address to intermediate physical addresses. The computing device may also configure the HLOS to allocate an application-specific identifier in the HLOS's virtual machine identifier (i.e., HLOS_VMID) in block 1206.

In block 1208, the computing device may configure the hypervisor to send a second stage configuration based on the HLOS_VMID to the DSP second stage SMMU. In an aspect, the DSP second stage SMMU may create a second stage translation table for the HLOS based on the HLOS_VMID. The SMMU (or hypervisor) may use the second stage translation table to perform second stage translations from the HLOS's intermediate physical address space to the computing device's physical memory address space.

In block 1210, the computing device may configure the HLOS to request that the DSP's hypervisor create a shared virtual memory process using the HLOS_VMID, the selected ASID, and the HLOS first stage translation table.

The computing device may also configure the DSP's hypervisor to program a first stage memory management unit (MMU) and initiate the share virtual memory process in block 1212. In an aspect, the DSP's first stage MMU may initiate a first stage translation table that is the same as the HLOS's first stage translations table. Thus, in this aspect, the HLOS and the DSP may share virtual memory because they share the same first stage translation table.

With the shared virtual memory processes completed in block 1212 the computing device processor may disable the hypervisor in block 1008 as described above with reference to FIG. 10 when there is no need for a sandbox session.

Figure 13:
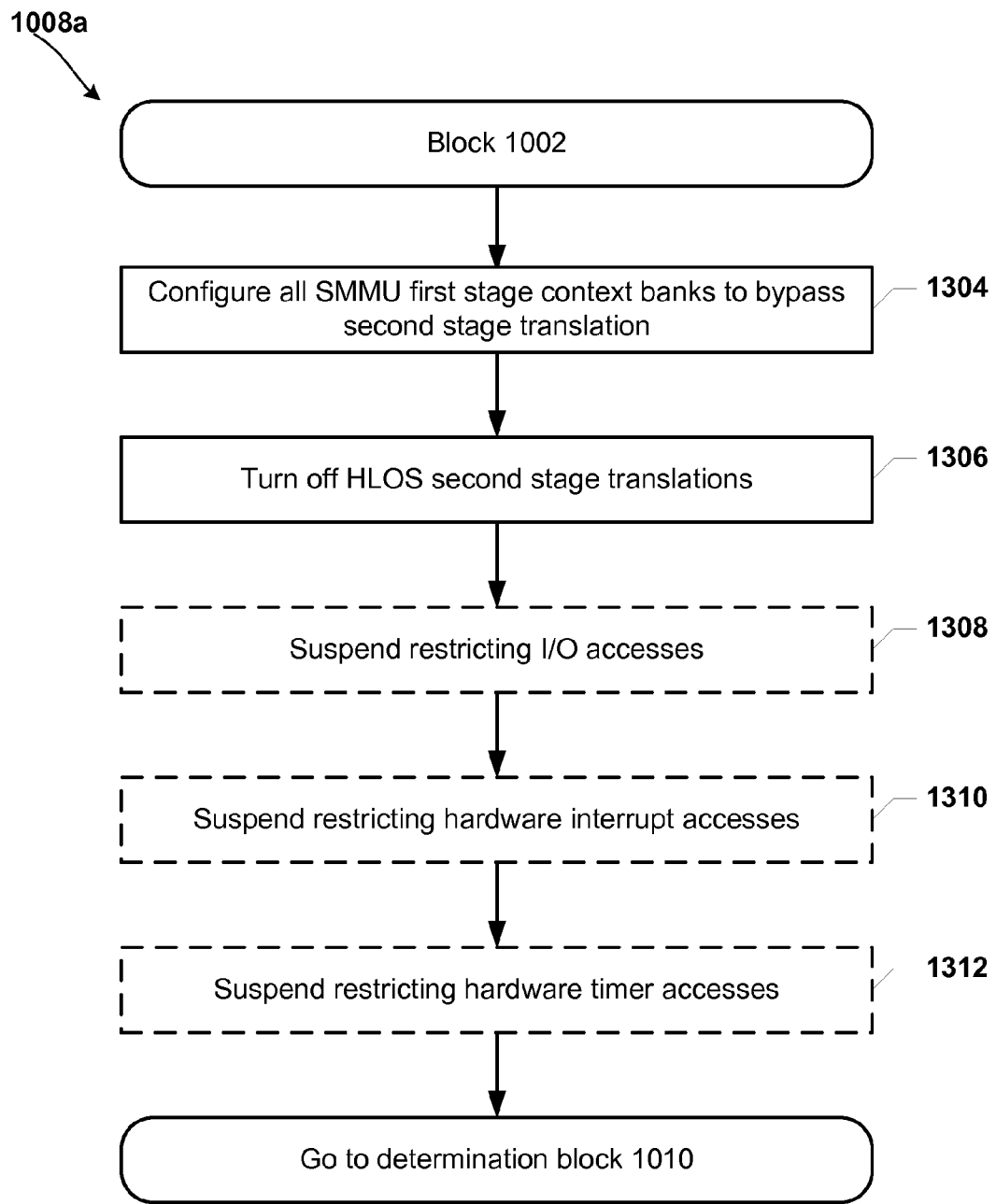
FIG. 13 is a process flow diagram illustrating an aspect method of disabling a hypervisor.

FIG. 13 illustrates an aspect method 1008a for disabling the hypervisor on the computing device.

In block 1304, the hypervisor may configure all SMMU first stage context banks to bypass the second stage translations. The hypervisor may also turn off the HLOS's second stage translations in block 1306.

In some aspects, the hypervisor may suspend various other activities when disabled. For example, the hypervisor may optionally suspend restricting I/O accesses in optional block 1308. The hypervisor may also suspend restricting hardware interrupt accesses in optional block 1310. Additionally, in optional block 1312, the hypervisor may suspend restricting hardware timer accesses.

The hypervisor may determine whether the hypervisor received a signal to start a sandbox session in determination block 1010 as described above with reference to FIG. 10.

In some aspects, the various hypervisor functions (e.g., access control, sandboxing memory, etc.) may be disabled across an integrated circuit boundary and/or chip boundary.

In one aspect, in a fusion-like chipset combination that includes discrete chipsets (e.g., a modem chip and an application processor chip), a master chipset (i.e., a master hypervisor) may suspend sandboxing memory or other access controls in other chipsets when hypervisor functionality has been disabled. For instance, the master hypervisor in an application processor chipset may suspend second stage translations from intermediate physical addresses to physical addresses in a modem or DSP chipset. Thus, when hypervisor functions are disabled, the master hypervisor may suspend these functions in a number of discrete chips.

Figure 14:
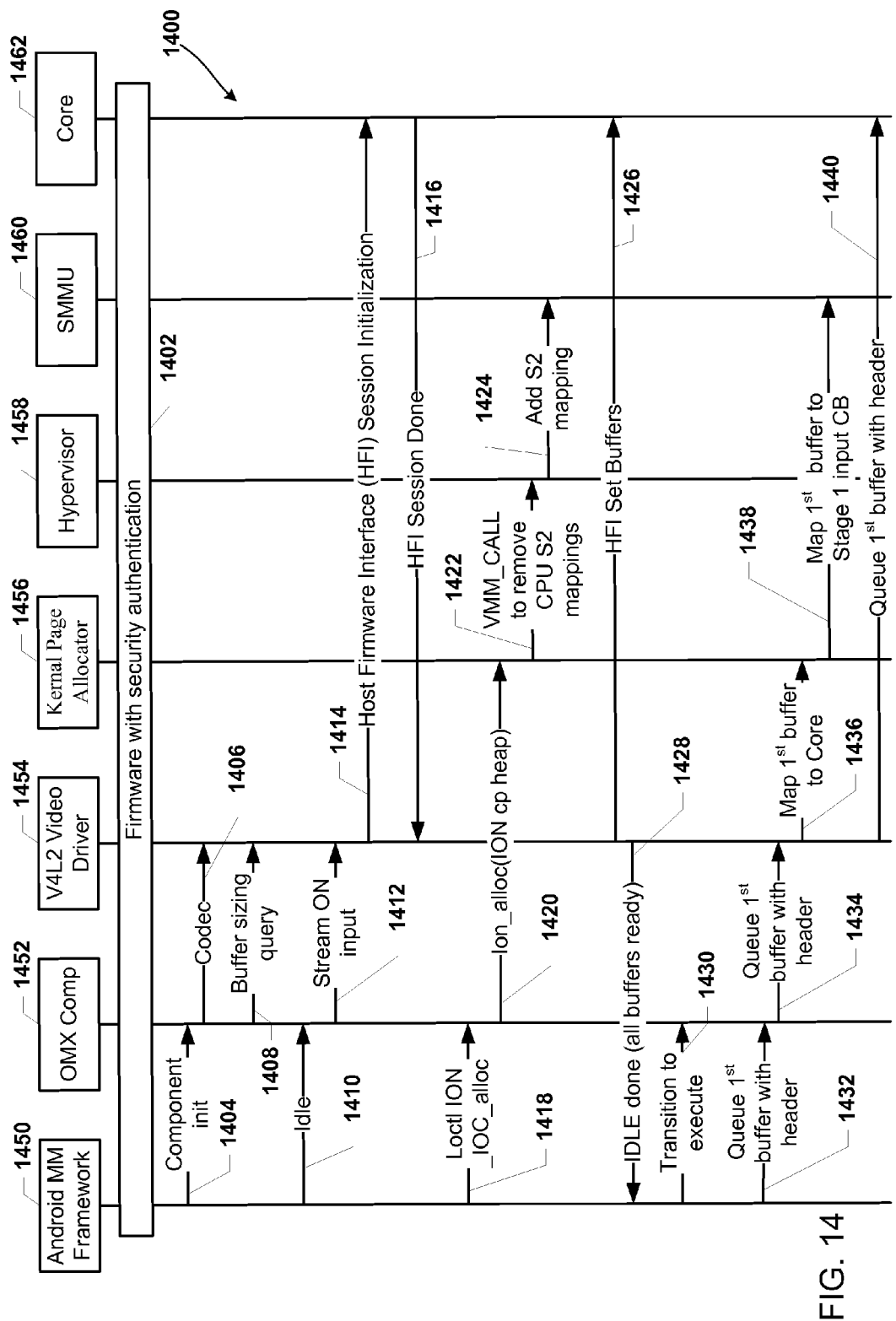
FIG. 14 is a call flow diagram illustrating signaling involved in initiating a sandbox session according on a computing device.

FIG. 14 illustrates call flows 1400 between multiple components operating on the computing device while setting up a sandbox session for a content-protected video signal. In various aspects, pages for video buffer may be 4 kb pages and may fragment the HLOS's second stage translation page tables.

In an aspect, a signal 1402 may be sent to the various components, such as an Android MM framework 1450, an OpenMax (OMX) component 1452, a V4L2 video driver 1454, a kernel page allocator 1456, a hypervisor 1458, a SMMU 1460, and a core 1462, to initialize firmware with security authentication. In an aspect, the security authentication may be an ARM TrustZone®. In another aspect, if the video is on a DSP, the computing device may load the DSP video application and codec.

In an aspect, an Android MM framework 1450 may send a signal 1404 to the OMX component to initialize the latter. The OMX component 1452 may send a signal 1406 to set a codec on the V4L2 video driver 1454. The OMX component 1452 may also send a buffer sizing query signal 1408 to the V4L2 video driver 1454. The Android MM framework 1450 may also send an idling signal 1410 to the OMX component 1452.

In another aspect, the OMX component 1452 may send a stream ON input signal 1412 to the V4L2 video driver 1454. The V4L2 video driver 1454 may send a host firmware interface (HFI) session initialization signal 1414 to the core 1462. The Core 1462 may response to the HFI session initialization signal 1414 by sending an "HFI session done" signal 1416 to the V4L2 video driver 1454.

The Android MM framework may send a memory allocation signal 1418 (i.e., "Ioctl ION_IOC_ALLOC") to the OMX component 1452. In another aspect, the Android MM framework may send the memory allocation signal 1418 to manage the page pool. The OMX V42L video driver 1454 may send an "Ion_alloc(ION cp heap)" signal 1420 to the kernel page allocator 1456.

The kernel page allocator 1456 may then send a VMM_CALL signal 1422 to the hypervisor 1458 to remove processor second stage mappings. In an aspect, this signal 1422 may notify the hypervisor that a sandbox session has started and that certain physical memory locations must be removed from those physical address accessible to the HLOS. In a further aspect, the hypervisor 1458 may send a second-stage-translation-mapping signal 1424 to the SMMU 1460. In an aspect, the SMMU may implement these second stage translations (i.e., the SMMU may resume second stage translations). In a further aspect, the SMMU may maintain mappings from the HLOS to accessible physical addresses (i.e., mappings to physical addresses that have not been hidden from the HLOS). In a further aspect, if the video is on a DSP, the kernel page allocator 1456 may additionally signal the hypervisor 1458 to map pages to a DSP second stage translation mapping.

In another aspect, the V4L2 video driver 1454 may send host firmware interface set buffers 1426 to the core 1462 and may send an idle signal 1428 indicating to the Android MM framework that all buffers are ready. The Android MM framework 1450 may then signal 1430 the OMX component to transition to execute. The Android MM framework 1450 may also send the OMX component 1452 a signal 1432 to queue the first buffer with a header. The OMX component 1452 may also send a signal 1434 to the V4L2 video driver 1454 to queue the first buffer with a header.

The V4L2 video driver 1454 may send to the kernel page allocator 1456 a signal 1436 that maps the first buffer to the Core 1462. The kernel page allocator 1456 may signal 1438 to the SMMU 1460 to map the first buffer to the first stage translation input context banks. The V4L2 video driver 1454 may also send a signal 1440 queuing a first buffer with a header to the Core 1462.

Figure 15:
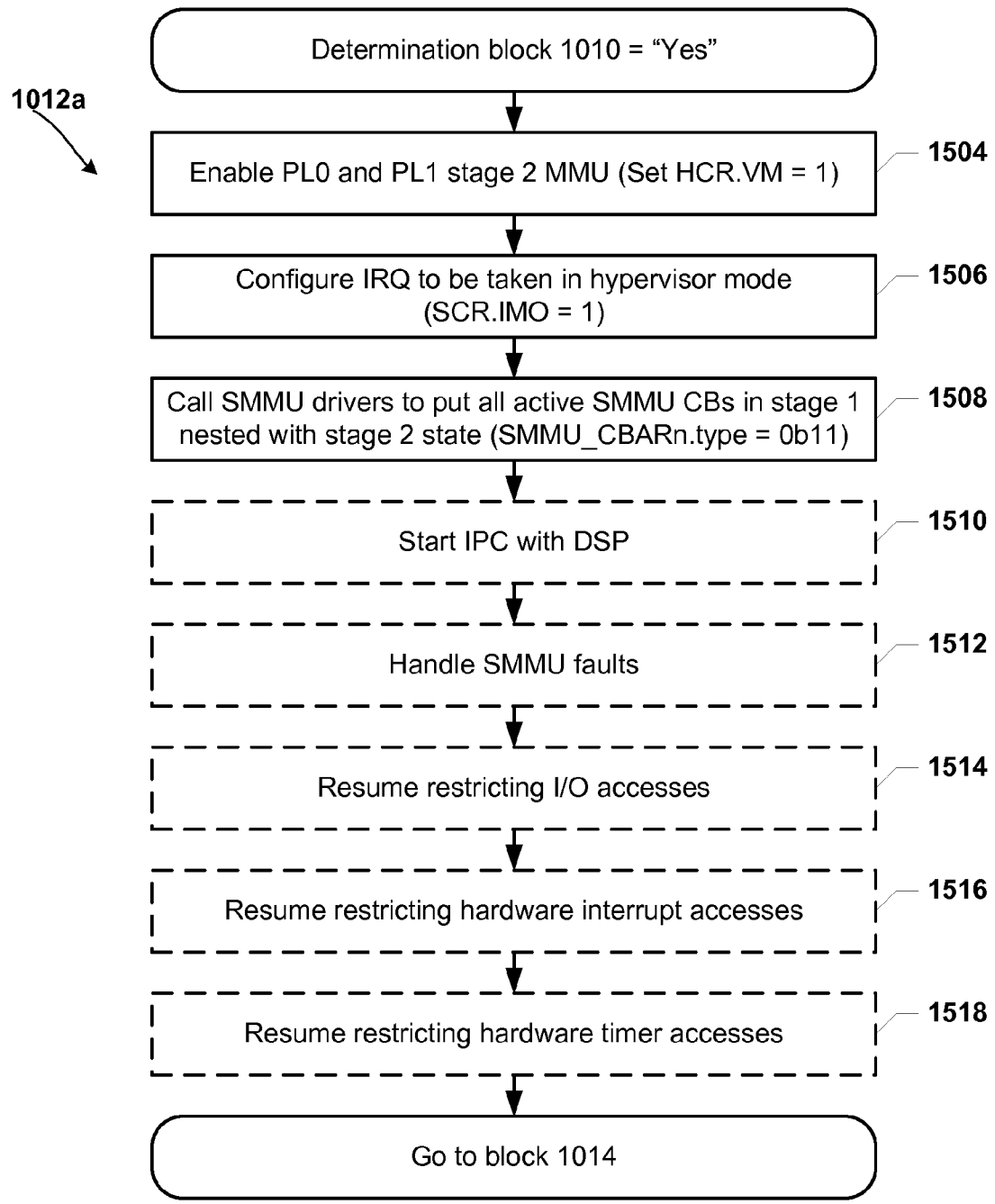
FIG. 15 is a process flow diagram illustrating an aspect method of enabling a hypervisor.

FIG. 15 illustrates an aspect method 1012a that may be implemented in a computing device processor for enabling the hypervisor (i.e., after the hypervisor is disabled in block 1010 described above with reference to FIG. 10). In block 1504, the computing device may enable PL0 and PL1 (i.e., privilege level 1 and privilege level 2) second stage MMU by setting HCR.VM to "1." In block 1506, the computing device may configure the interrupt requests ("IRQ") to be taken in hypervisor mode. In an aspect, the computing device may accomplish this by setting SCR.IMO to "1."

The computing device may also call SMMU drivers in block 1508 to put all active SMMU context banks in a state wherein the first stage translations are nested with second stage translations. The computing device may set this state by setting the SMMU_CBARn.type element to "0b11".

In an aspect, the hypervisor may be enabled in block 1012 as described above with reference to FIG. 10 once these steps are accomplished. After being enabled in block 1012, the hypervisor may optionally start interprocessor communications (IPC) with a DSP in optional block 1510. The hypervisor may also optionally handle SMMU faults in optional block 1512.

In some aspects, the hypervisor may resume various other activities when enabled. For example, the hypervisor may resume restricting I/O accesses in optional block 1514. The hypervisor may also resume restricting hardware interrupt access in block 1516. In block 1518, the hypervisor may additionally resume restricting hardware timer accesses.

The computing device processor may then implement access control in block 1014 as described above with reference to FIG. 10.

In some aspects, the various hypervisor functions (e.g., access control, sandboxing memory, etc.) may be enabled across an integrated circuit boundary and/or chip boundary. As discussed above in relation to FIG. 13, in one aspect, a master chipset (i.e., a master hypervisor) may control sandboxing memory in other chipsets through, for example, a peripheral component interconnect express interface. For instance, the master hypervisor in an application processor chipset may control the translations from intermediate physical addresses to physical addresses in a modem or DSP chipset. Thus, when hypervisor functions are enabled, the master hypervisor may perform those functions across a number of discrete chips.

Figure 16A:
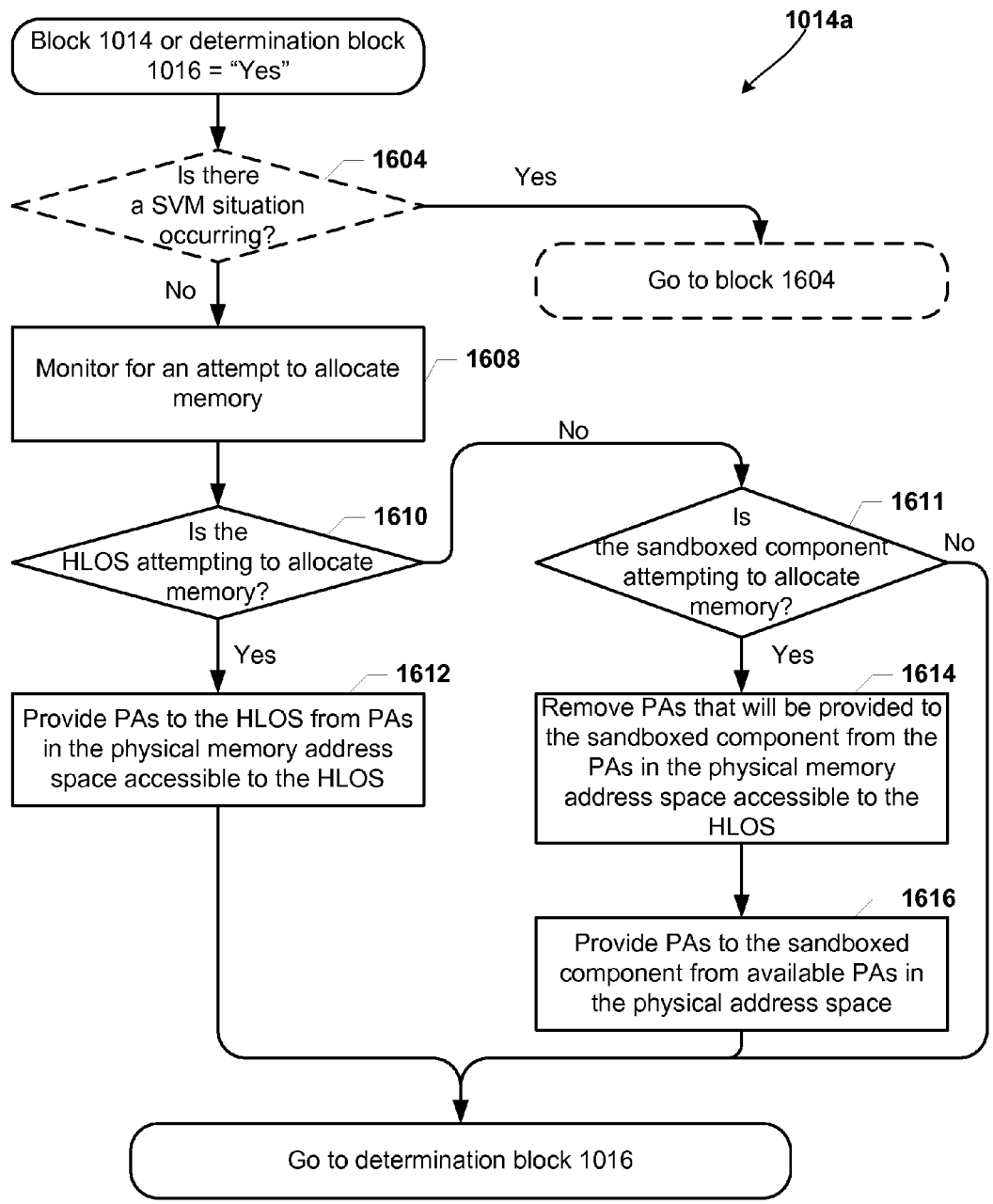
FIGS. 16A and 16B are process flow diagrams illustrating aspect methods of implementing second stage translations.
Figure 16B:
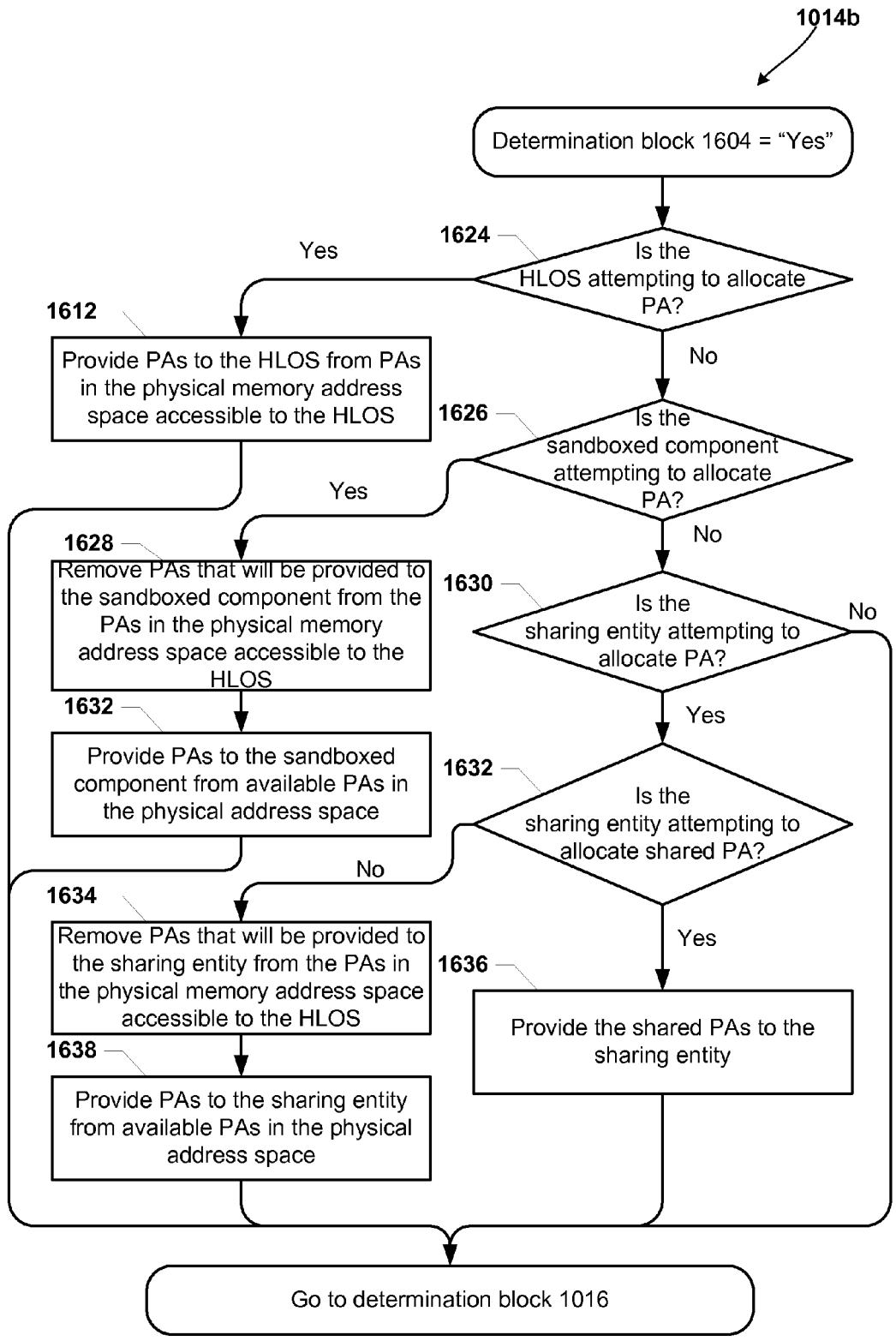

FIGS. 16A and 16B illustrate aspect methods that may be implemented on a computing device processor for performing second stage translations during sandbox sessions. In various aspects, the hypervisor may manage the locations in the physical memory address space in which various components (e.g., the HLOS or a DSP) may access.

FIG. 16A illustrates an aspect method 1014a for the hypervisor allocating memory during a sandbox session. When the hypervisor is enabled in block 1012 as described above with reference to FIG. 10.

The hypervisor may determine in optional determination block 1604 whether a shared virtual memory situation currently exists. In an aspect, a shared virtual memory situation may exist when, for example, the HLOS is sharing virtual memory with another component. If a there is a shared virtual memory situation occurring (i.e., determination block 1604="Yes"), the hypervisor may execute method 1014*b* described below with reference to FIG. 16B. Otherwise (i.e., determination block 1604="No"), the hypervisor may monitor for an attempt to allocate memory in block 1608. The hypervisor may determine whether the HLOS is attempting to allocate memory in determination block 1610. In an aspect, the HLOS may attempt to allocate memory for applications or processes currently operating on the HLOS. For example, the HLOS may allocate memory for an application by creating a virtual address space accessed by that application. If processor determines that the HLOS is attempting to allocate memory (i.e., determination block 1610="Yes"), the hypervisor may provide physical addresses to the HLOS from the physical memory address space that is accessible to the HLOS in block 1612. In an aspect, the HLOS may not have arbitrary access to the physical address space because some of the physical addresses are removed from the HLOS's second stage translation mappings and may be allocated for protected content. For example, the HLOS may not have a mapping to a physical address that is allocated to a DSP for storing 4 kb video buffers. The hypervisor may then determine whether the sand box session is over in determination block 1016 described above with reference to FIG. 10.

If the HLOS is not attempting to allocate memory (i.e., determination block 1610="No"), the hypervisor may determine whether the sandboxed component is attempting to allocate memory in determination block 1611. For example, the hypervisor may determine whether a DSP processing a secure video signal is attempting to store 4 kb video buffers in the physical memory. If the sandboxed component is not attempting to allocate memory (i.e., determination block 1611="No"), the hypervisor may determine whether the sand box session is over in determination block 1016 described above with reference to FIG. 10.

If the hypervisor determines that the sandboxed component is attempting to allocate memory (i.e., determination block 1611="Yes"), the hypervisor may remove the physical addresses that will be provided to the sandboxed component from the physical addresses in the physical address space that are accessible to the HLOS in block 1614. The hypervisor may also provide physical addresses to the sandboxed component from available physical addresses in the physical address space in block 1616. In an aspect, available physical addresses may be physical addresses in the physical address space that have not been allocated to the HLOS. In other words, the available physical addresses are "free" memory addresses. In an aspect, once the hypervisor allocates memory in the physical address space for use by the sandboxed component, the HLOS may no longer have access to that physical memory during the sandbox session. For example, once a 4 kb video buffer for a secure video is stored at a particular physical address, the HLOS may no longer have a mapping to that physical address (i.e., the HLOS may no longer be able to "see" that physical addresses to allocate it). The hypervisor may then determine whether the sand box session is over in determination block 1016 described above with reference to FIG. 10.

FIG. 16B illustrates an aspect method 1014*b* that may be implemented in a hypervisor for allocating memory during a sandbox session while the HLOS is sharing virtual memory with another component (i.e., when determination block 1604="Yes"). In determination block 1624, the hypervisor may determine whether the HLOS is attempting to allocate physical addresses. For example, the HLOS may be attempting to allocate certain physical addresses in the physical address space for use by applications running on the HLOS. If the hypervisor determines that the HLOS is attempting to allocate physical addresses (i.e., determination block 1624="Yes"), the hypervisor may provide physical addresses to the HLOS from the physical addresses in the physical memory address space that are accessible to the HLOS in block 1612. In the aspect described above with reference to FIG. 16A, physical addresses may be accessible to the HLOS when, for instance, the hypervisor allows the HLOS to allocate those physical addresses. In other words, physical addresses accessible to the HLOS have not been allocated to the sandboxed component and hidden from the HLOS. After allocating physical addresses to the HLOS, the hypervisor may determine whether the sandbox session is over in determination block 1016 described above with reference to FIG. 10.

If the hypervisor determines that the HLOS is not attempting to allocate physical addresses (i.e., determination block 1624="No"), the hypervisor may determine whether the sandboxed component is attempting to allocate physical addresses in determination block 1626. For example, a DSP operating within a sandboxed component may attempt to access certain physical address to store 4 kb video buffers. If the hypervisor determines that the sandboxed component is attempting to allocate physical addresses (i.e., determination block 1626="Yes"), the hypervisor may remove the physical addresses that will be provided to the sandboxed component from the PAs in the physical memory address space accessible to the HLOS in block 1628. In an aspect, physical addresses allocated to the sandboxed component may be hidden from the HLOS. In other words, the hypervisor may remove the second stage mappings from the HLOS to those physical addresses allocated to the sandboxed component. The hypervisor may also provide physical addresses to the sandboxed component from available physical addresses in the physical address space in block 1632. In an aspect, available physical addresses may include those physical addresses for which the hypervisor has not set aside for use by the HLOS (i.e., "free" physical addresses in the physical address space). After allocating physical addresses to the sandboxed component, the hypervisor may determine whether the sandbox session is over in determination block 1016 described above with reference to FIG. 10.

If the hypervisor determines that the sandboxed component is not attempting to allocate physical addresses (i.e., determination block 1626="No"), the hypervisor may determine whether the sharing entity is attempting to allocate physical addresses in determination block 1630. In an aspect, the sharing entity may be a component operating on the computing device that is sharing virtual memory with the HLOS. In another aspect, the HLOS and another entity may share virtual memory by sharing pointers to physical addresses. In other words, the HLOS and the sharing entity may be able to access or allocate the same physical addresses in the physical memory address space.

If the hypervisor determines that the sharing entity is not attempting to allocate physical addresses (i.e., determination block 1630="No"), the hypervisor may determine whether the sandbox session is over in determination block 1016 described above with reference to FIG. 10. Otherwise (i.e., determination block 1630="Yes"), the hypervisor may determine whether the sharing entity is attempting to allocate shared physical addresses in determination block 1632. In other words, the hypervisor may determine whether the sharing entity is attempting to utilize, change, access, allocate, or otherwise read or write to a physical address shared with the HLOS.

If the hypervisor determines that the sharing entity is attempting to allocate shared physical addresses (i.e., determination block 1632="Yes"), the hypervisor may provide shared physical addresses to the sharing entity in block 1636. In an aspect, the HLOS may also access and allocate the shared physical addresses. In other words, the hypervisor may not hide the shared physical addresses allocated to the sharing entity from the HLOS. The hypervisor may determine whether the sandbox session is over in determination block 1016 described above with reference to FIG. 10.

Otherwise, if the hypervisor determines that the sharing entity is not attempting to allocated shared physical addresses (i.e., determination block 1632="No"), the hypervisor may remove the physical addresses that will be provided to the sharing entity from the physical addresses in the physical memory address space that are accessible to the HLOS in block 1634. In block 1638, the hypervisor may provide physical addresses to the sharing entity from available physical addresses in the physical address space. In an aspect, the hypervisor may treat the sharing entity like a sandboxed component as described above when the sharing entity is not accessing physical addresses shared with the HLOS. After allocating physical addresses, the hypervisor may determine whether the sandbox session is over in determination block 1016 described above with reference to FIG. 10.

Figure 17:
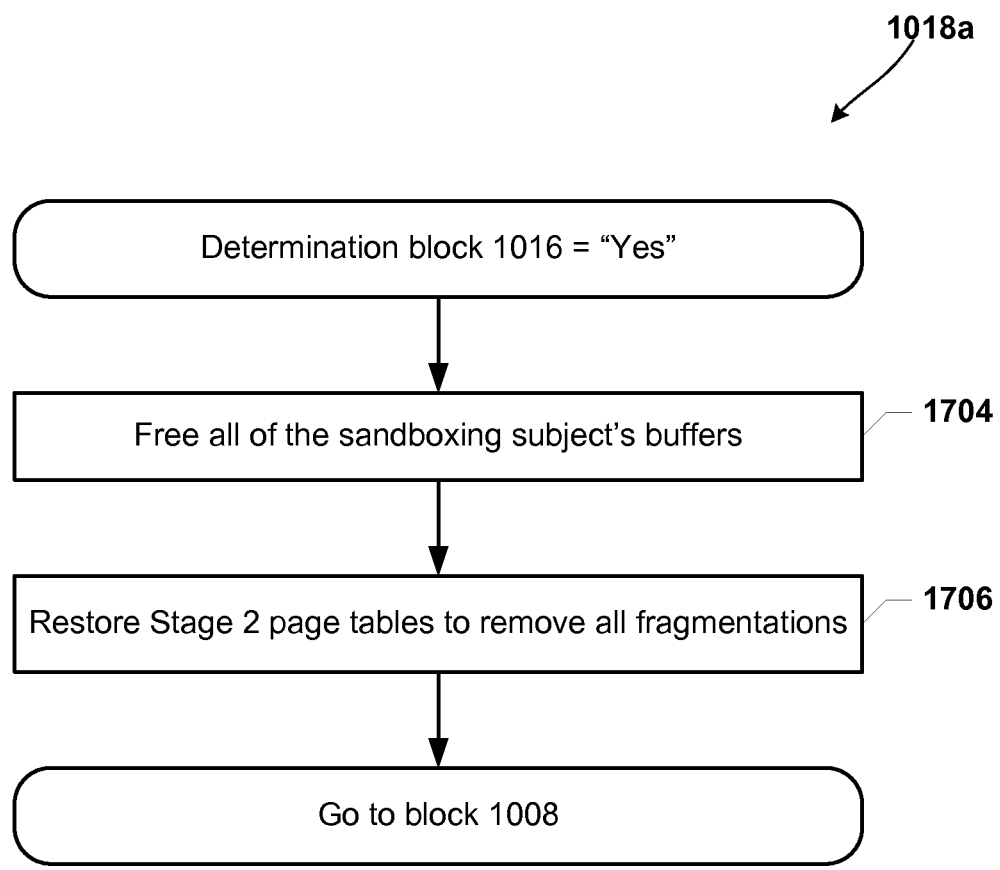
FIG. 17 is a process flow diagram illustrating an aspect method of performing a sandbox session teardown.

FIG. 17 illustrates an aspect method 1018*a* that may be implemented in a hypervisor for performing a session teardown. When the hypervisor determines that the sandbox session is over (i.e., determination block 1016="Yes") the hypervisor may free all of the sandboxed component's buffers in block 1704. For example, the hypervisor may free 4 kb video buffers stored in various physical addresses in the physical memory address space. In an aspect, by freeing these buffers, the hypervisor may prepare these physical addresses to be accessible to the HLOS.

In block 1706, the hypervisor may restore the second stage translation page tables to remove all fragmentations. In an aspect, the hypervisor may restore the physical addresses in the physical address space that may have been punctured by memory allocations to the sandboxed component. In another aspect, the hypervisor may add second stage mappings that may enable the HLOS to access the physical addresses that the hypervisor hid after allocating those physical addresses to the sandboxed component. The hypervisor may also be disabled in block 1008 as described above with reference to FIG. 10. Thus, in an aspect, after performing the session tear-down procedure, the hypervisor may put the HLOS back in a position in which it may allocate memory directly from the entire physical memory address space, and then be disabled.

Figure 18:
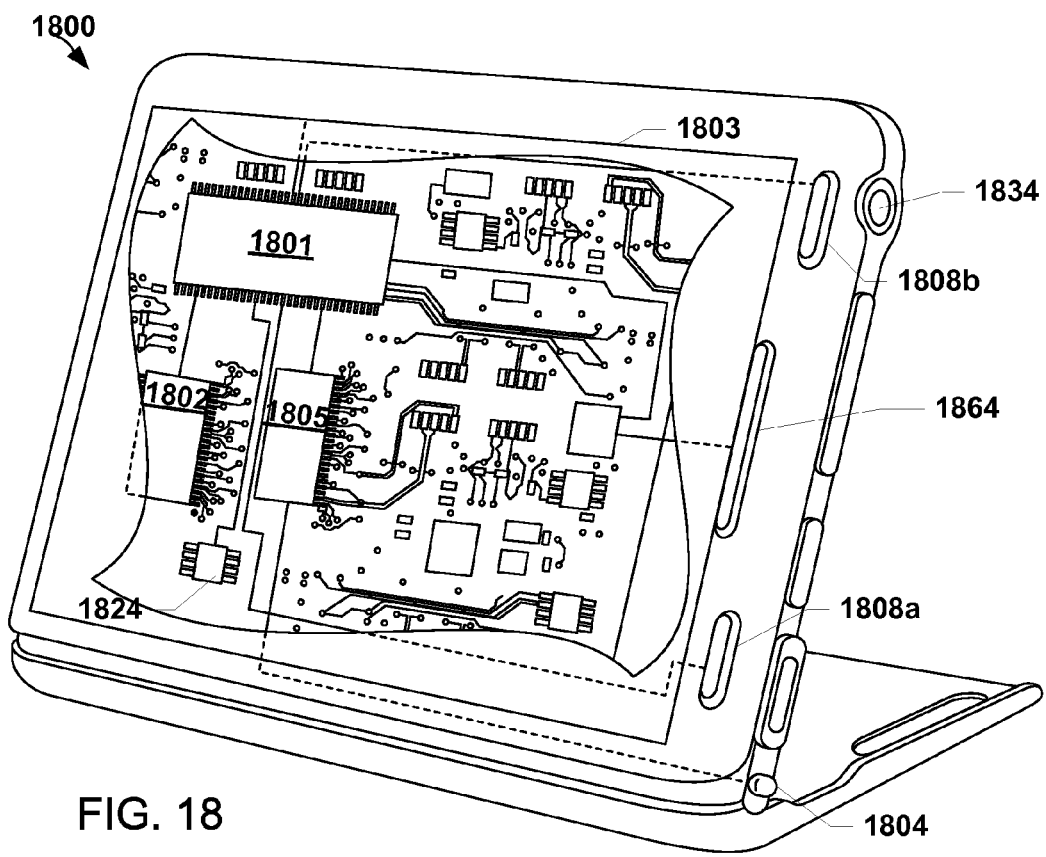
FIG. 18 is component block diagram of a computing device suitable for implementing the various aspects.

Typical computing devices 1800 suitable for use with the various aspects will have in common the components illustrated in FIG. 18. For example, a typical computing device 1800 may include a processor 1802 coupled to internal memory 1801, a display 1803, and to a speaker 1864. Additionally, the computing device may have an antenna 1804 for sending and receiving electromagnetic radiation coupled to the processor 1802. In some aspects, the computing device 1800 may include one or more specialized or general purpose processors 1805, 1824 which may include systems on chips. Computing devices typically also include a key pad or miniature keyboard (not shown) and menu selection buttons 1808*a*, 1808*b* for receiving user inputs. Computing devices may also include a power button 1834 for turning the computing devices on and off.

Figure 19:
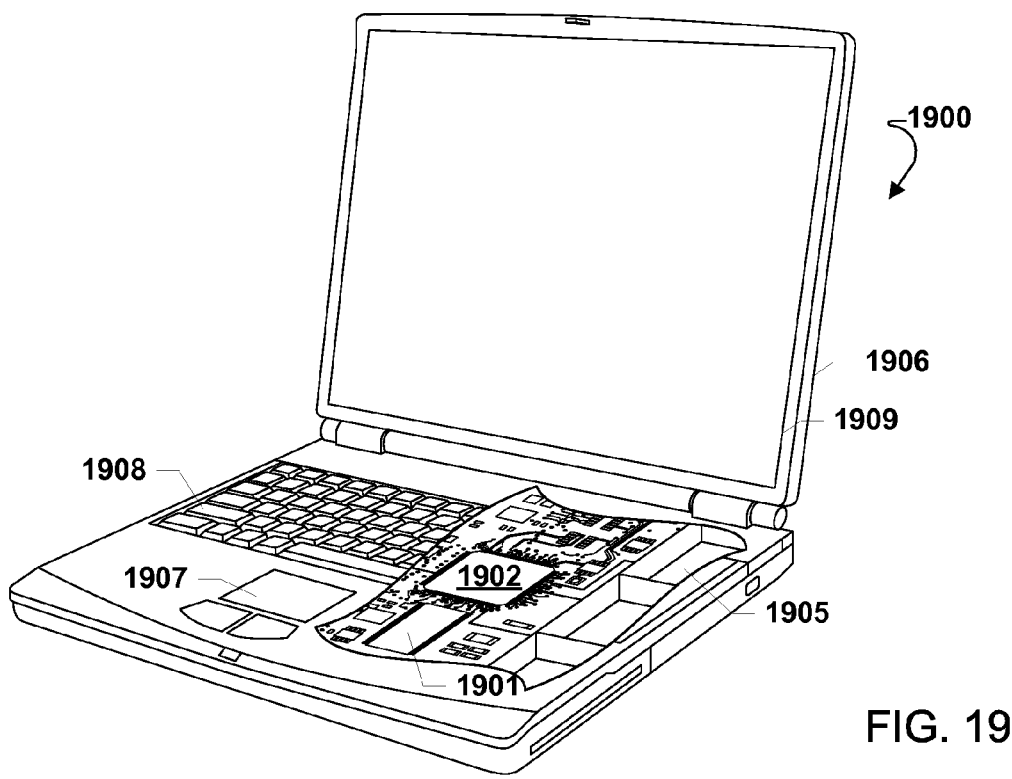
FIG. 19 is component block diagram of another computing device suitable for implementing the various aspects.

Other forms of computing devices, such as a laptop computer 1900 illustrated in FIG. 19, may also implement and benefit from the various aspects. Computing devices like a laptop computer 1900 typically include a processor 1902 coupled to internal memory 1901 and a large capacity non-volatile memory, such as a disk drive 1905 or Flash memory, and a display 1909. Computing devices may also include a keyboard 1908 and selection buttons 1907 for receiving user inputs.

The processors 1802, 1805, 1824, 1902 used in computing devices implementing the various aspects may be any programmable microprocessor, microcomputer, or multiple processor chip or chips that can be configured by processor-executable software instructions (applications) to perform a variety of functions, including the functions of the various aspects described herein. Typically, software applications and processor-executable instructions may be stored in the internal memory 1801, 1901 before they are accessed and loaded into the processors 1802, 1805, 1824, 1902. In some computing devices, the processors 1802, 1805, 1824, 1902 may include internal memory sufficient to store the application software instructions.

In some computing devices, the secure memory may be in a separate memory chip coupled to the processor 1802, 1805, 1824, 1902. In many computing devices, the internal memory 1801, 1901 may be a volatile or nonvolatile memory, such as flash memory, or a mixture of both. The memory may include any number of different types of memory technologies, including phase change memory (PCM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. For the purposes of this description, a general reference to memory refers to all memory accessible by the processors 1802, 1805, 1824, 1902 including internal memory, removable memory plugged into the computing device, and memory within the processors.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory processor-readable storage medium or a non-transitory computer-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of managing memory on a computing device, comprising:
    initializing a hypervisor, a security monitor, and a high-level operating system (HLOS);
    disabling the hypervisor after initialization;
    monitoring for a signal from the security monitor to start a sandbox session;
    enabling the hypervisor in response to receiving the signal from the security monitor to start the sandbox session; and
    implementing access control while the hypervisor is enabled,
    wherein disabling the hypervisor comprises:
        configuring all system memory management units (SMMU) context banks to bypass second stage translation; and
        turning off second stage translations for the HLOS.

2. The method of claim 1, wherein disabling the hypervisor further comprises at least one of:
    suspending restricting the HLOS's accesses to hardware interrupts;
    suspending restricting the HLOS's accesses to hardware timers; and
    suspending restricting the HLOS's I/O accesses.

3. A method of managing memory on a computing device, comprising:
    initializing a hypervisor, a security monitor, and a high-level operating system (HLOS);
    disabling the hypervisor after initialization;
    monitoring for a signal from the security monitor to start a sandbox session;
    enabling the hypervisor in response to receiving the signal from the security monitor to start the sandbox session;
    implementing access control while the hypervisor is enabled;
    determining whether the sandbox session is over;
    performing a sandbox session tear-down procedure in response to determining that the sandbox session is over; and
    disabling the hypervisor after performing the sandbox session tear-down procedure.

4. The method of claim 3, wherein determining whether the sandbox session is over comprises receiving another signal indicating that the sandbox session is over.

5. The method of claim 3, wherein performing the sandbox session tear-down procedure comprises:
    freeing all buffers for a sandboxed component; and
    restoring second stage translation page tables to remove all fragmentations.

6. A method of managing memory on a computing device, comprising:
    initializing a hypervisor, a security monitor, and a high-level operating system (HLOS);
    disabling the hypervisor after initialization;
    monitoring for a signal from the security monitor to start a sandbox session;
    enabling the hypervisor in response to receiving the signal from the security monitor to start the sandbox session; and
    implementing access control while the hypervisor is enabled,
    wherein enabling the hypervisor comprises:
        enabling PL0 and PL1 second stage memory management units;
        configuring interrupt requests to be taken in hypervisor mode; and
        calling system memory management units (SMMU) drivers to put all active SMMU context banks in first stage translations nested within second stage translations.

7. The method of claim 6, further comprising starting inter-processor communications with a digital signal processor.

8. The method of claim 6, further comprising handling SMMU faults.

9. A method of managing memory on a computing device, comprising:
- initializing a hypervisor, a security monitor, and a high-level operating system (HLOS);
- disabling the hypervisor after initialization;
- monitoring for a signal from the security monitor to start a sandbox session;
- enabling the hypervisor in response to receiving the signal from the security monitor to start the sandbox session; and
- implementing access control while the hypervisor is enabled,
- wherein implementing access control comprises implementing second stage translations and further comprises at least one of:
  - resuming restricting the HLOS's accesses to hardware interrupts;
  - resuming restricting the HLOS's accesses to hardware timers; and
  - resuming restricting the HLOS's I/O accesses.

10. A method of managing memory on a computing device, comprising:
- initializing a hypervisor, a security monitor, and a high-level operating system (HLOS);
- disabling the hypervisor after initialization;
- monitoring for a signal from the security monitor to start a sandbox session;
- enabling the hypervisor in response to receiving the signal from the security monitor to start the sandbox session; and
- implementing access control while the hypervisor is enabled,
- wherein implementing access control comprises implementing second stage translations, and
- wherein implementing second stage translations comprises:
  - monitoring for an attempt by the HLOS to allocate memory; and
  - providing to the HLOS one or more physical addresses in a physical address space accessible to the HLOS when the HLOS attempts to allocate memory.

11. The method of claim 10, further comprising:
- determining whether a sandboxed component is attempting to allocate memory when the HLOS attempts to allocate memory; and
- providing physical addresses to the sandboxed component from the physical addresses in the physical address space in response to determining that the sandboxed component is attempting to allocate memory.

12. The method of claim 11, wherein providing the physical addresses to the sandboxed component comprises:
- removing the physical addresses to be provided to the sandboxed component from the physical addresses in the physical address space that are accessible to the HLOS; and
- providing the physical addresses to the sandboxed component from available physical addresses in the physical address space.

13. A computing device, comprising:
- a memory; and
- a processor coupled to the memory, wherein the processor is configured with processor-executable instructions to perform operations comprising:
  - initializing a hypervisor, a security monitor, and a high-level operating system (HLOS);
  - disabling the hypervisor after initialization;
  - monitoring for a signal from the security monitor to start a sandbox session;
  - enabling the hypervisor in response to receiving the signal from the security monitor to start the sandbox session; and
  - implementing access control while the hypervisor is enabled,
- wherein the processor is configured with processor-executable instructions to perform operations such that disabling the hypervisor comprises:
  - configuring all system memory management units (SMMU) context banks to bypass second stage translation; and
  - turning off second stage translations for the HLOS.

14. The computing device of claim 13, wherein the processor is configured with processor-executable instructions to perform operations such that disabling the hypervisor further comprises at least one of:
- suspending restricting the HLOS's accesses to hardware interrupts;
- suspending restricting the HLOS's accesses to hardware timers; and
- suspending restricting the HLOS's I/O accesses.

15. A computing device, comprising:
- a memory; and
- a processor coupled to the memory, wherein the processor is configured with processor-executable instructions to perform operations comprising:
  - initializing a hypervisor, a security monitor, and a high-level operating system (HLOS);
  - disabling the hypervisor after initialization;
  - monitoring for a signal from the security monitor to start a sandbox session;
  - enabling the hypervisor in response to receiving the signal from the security monitor to start the sandbox session;
  - implementing access control while the hypervisor is enabled;
  - determining whether the sandbox session is over;
  - performing a sandbox session tear-down procedure in response to determining that the sandbox session is over; and
  - disabling the hypervisor after performing the sandbox session tear-down procedure.

16. The computing device of claim 15, wherein the processor is configured with processor-executable instructions to perform operations such that determining whether the sandbox session is over comprises receiving another signal indicating that the sandbox session is over.

17. The computing device of claim 15, wherein the processor is configured with processor-executable instructions to perform operations such that performing the sandbox session tear-down procedure comprises:
- freeing all buffers for a sandboxed component; and
- restoring second stage translation page tables to remove all fragmentations.

18. A computing device, comprising:
- a memory; and
- a processor coupled to the memory, wherein the processor is configured with processor-executable instructions to perform operations comprising:
  - initializing a hypervisor, a security monitor, and a high-level operating system (HLOS);
  - disabling the hypervisor after initialization;
  - monitoring for a signal from the security monitor to start a sandbox session;

enabling the hypervisor in response to receiving the signal from the security monitor to start the sandbox session; and implementing access control while the hypervisor is enabled, wherein the processor is configured with processor-executable instructions to perform operations such that enabling the hypervisor comprises:

enabling PL0 and PL1 second stage memory management units;

configuring interrupt requests to be taken in hypervisor mode; and calling system memory management units (SMMU) drivers to put all active SMMU context banks in first stage translations nested within second stage translations.

19. The computing device of claim 18, wherein the processor is configured with processor-executable instructions to perform operations further comprising starting interprocessor communications with a digital signal processor.

20. The computing device of claim 18, wherein the processor is configured with processor-executable instructions to perform operations further comprising handling SMMU faults.

21. A computing device, comprising:
a memory; and
a processor coupled to the memory, wherein the processor is configured with processor-executable instructions to perform operations comprising:
    initializing a hypervisor, a security monitor, and a high-level operating system (HLOS);
    disabling the hypervisor after initialization;
    monitoring for a signal from the security monitor to start a sandbox session;
    enabling the hypervisor in response to receiving the signal from the security monitor to start the sandbox session; and
    implementing access control while the hypervisor is enabled,
wherein the processor is configured with processor-executable instructions to perform operations such that implementing access control comprises implementing second stage translations and implementing access control further comprises at least one of:
    resuming restricting the HLOS's accesses to hardware interrupts;
    resuming restricting the HLOS's accesses to hardware timers; and
    resuming restricting the HLOS's I/O accesses.

22. A computing device, comprising:
a memory; and
a processor coupled to the memory, wherein the processor is configured with processor-executable instructions to perform operations comprising:
    initializing a hypervisor, a security monitor, and a high-level operating system (HLOS);
    disabling the hypervisor after initialization;
    monitoring for a signal from the security monitor to start a sandbox session;
    enabling the hypervisor in response to receiving the signal from the security monitor to start the sandbox session; and
    implementing access control while the hypervisor is enabled,
wherein the processor is configured with processor-executable instructions to perform operations such that:
    implementing access control comprises implementing second stage translations; and
    implementing second stage translations comprises:
        monitoring for an attempt by the HLOS to allocate memory; and
        providing to the HLOS one or more physical addresses in a physical address space accessible to the HLOS when the HLOS attempts to allocate memory.

23. The computing device of claim 22, wherein the processor is configured with processor-executable instructions to perform operations further comprising:
    determining whether a sandboxed component is attempting to allocate memory when the HLOS attempts to allocate memory; and
    providing physical addresses to the sandboxed component from the physical addresses in the physical address space in response to determining that the sandboxed component is attempting to allocate memory.

24. The computing device of claim 23, wherein the processor is configured with processor-executable instructions to perform operations such that providing the physical addresses to the sandboxed component comprises:
    removing the physical addresses to be provided to the sandboxed component from the physical addresses in the physical address space that are accessible to the HLOS; and
    providing the physical addresses to the sandboxed component from available physical addresses in the physical address space.

25. A computing device, comprising:
means for initializing a hypervisor, a security monitor, and a high-level operating system (HLOS);
means for disabling the hypervisor after initialization;
means for monitoring for a signal from the security monitor to start a sandbox session;
means for enabling the hypervisor in response to receiving the signal from the security monitor to start the sandbox session; and
means for implementing access control while the hypervisor is enabled,
wherein means for disabling the hypervisor comprises:
    means for configuring all system memory management units (SMMU) context banks to bypass second stage translation; and
    means for turning off second stage translations for the HLOS.

26. The computing device of claim 25, wherein means for disabling the hypervisor further comprises at least one of:
    means for suspending restricting the HLOS's accesses to hardware interrupts;
    means for suspending restricting the HLOS's accesses to hardware timers; and
    means for suspending restricting the HLOS's I/O accesses.

27. A computing device, comprising:
means for initializing a hypervisor, a security monitor, and a high-level operating system (HLOS);
means for disabling the hypervisor after initialization;
means for monitoring for a signal from the security monitor to start a sandbox session;
means for enabling the hypervisor in response to receiving the signal from the security monitor to start the sandbox session;
means for implementing access control while the hypervisor is enabled
means for determining whether the sandbox session is over;

means for performing a sandbox session tear-down procedure in response to determining that the sandbox session is over; and means for disabling the hypervisor after performing the sandbox session tear-down procedure.

28. The computing device of claim 27, wherein means for determining whether the sandbox session is over comprises means for receiving another signal indicating that the sandbox session is over.

29. The computing device of claim 27, wherein means for performing the sandbox session tear-down procedure comprises:
  means for freeing all buffers for a sandboxed component; and
  means for restoring second stage translation page tables to remove all fragmentations.

30. A computing device, comprising:
  means for initializing a hypervisor, a security monitor, and a high-level operating system (HLOS);
  means for disabling the hypervisor after initialization;
  means for monitoring for a signal from the security monitor to start a sandbox session;
  means for enabling the hypervisor in response to receiving the signal from the security monitor to start the sandbox session; and
  means for implementing access control while the hypervisor is enabled,
  wherein means for enabling the hypervisor comprises:
    means for enabling PL0 and PL1 second stage memory management units;
    means for configuring interrupt requests to be taken in hypervisor mode; and
    means for calling system memory management units (SMMU) drivers to put all active SMMU context banks in first stage translations nested within second stage translations.

31. The computing device of claim 30, further comprising means for starting interprocessor communications with a digital signal processor.

32. The computing device of claim 30, further comprising means for handling SMMU faults.

33. A computing device, comprising:
  means for initializing a hypervisor, a security monitor, and a high-level operating system (HLOS);
  means for disabling the hypervisor after initialization;
  means for monitoring for a signal from the security monitor to start a sandbox session;
  means for enabling the hypervisor in response to receiving the signal from the security monitor to start the sandbox session; and
  means for implementing access control while the hypervisor is enabled,
  wherein means for implementing access control comprises means for implementing second stage translations and further comprises at least one of:
    means for resuming restricting the HLOS's accesses to hardware interrupts;
    means for resuming restricting the HLOS's accesses to hardware timers; and
    means for resuming restricting the HLOS's I/O accesses.

34. A computing device, comprising:
  means for initializing a hypervisor, a security monitor, and a high-level operating system (HLOS);
  means for disabling the hypervisor after initialization;
  means for monitoring for a signal from the security monitor to start a sandbox session;
  means for enabling the hypervisor in response to receiving the signal from the security monitor to start the sandbox session; and
  means for implementing access control while the hypervisor is enabled,
  wherein:
    means for implementing access control comprises means for implementing second stage translations; and
    means for implementing second stage translations comprises:
      means for monitoring for an attempt by the HLOS to allocate memory; and
      means for providing to the HLOS one or more physical addresses in a physical address space accessible to the HLOS when the HLOS attempts to allocate memory.

35. The computing device of claim 34, further comprising:
  means for determining whether a sandboxed component is attempting to allocate memory when the HLOS attempts to allocate memory; and
  means for providing physical addresses to the sandboxed component from physical addresses in the physical address space in response to determining that the sandboxed component is attempting to allocate memory.

36. The computing device of claim 35, wherein means for providing the physical addresses to the sandboxed component comprises:
  means for removing the physical addresses to be provided to the sandboxed component from the physical addresses in the physical address space that are accessible to the HLOS; and
  means for providing the physical addresses to the sandboxed component from available physical addresses in the physical address space.

37. A non-transitory processor-readable storage medium having stored thereon processor-executable software instructions configured to cause a processor to perform operations for managing memory on a computing device, the operations comprising:
  initializing a hypervisor, a security monitor, and a high-level operating system (HLOS);
  disabling the hypervisor after initialization;
  monitoring for a signal from the security monitor to start a sandbox session;
  enabling the hypervisor in response to receiving the signal from the security monitor to start the sandbox session; and
  implementing access control while the hypervisor is enabled,
  wherein the stored processor-executable software instructions are configured to cause a processor to perform operations such that disabling the hypervisor comprises:
    configuring all system memory management units (SMMU) context banks to bypass second stage translation; and
    turning off second stage translations for the HLOS.

38. The non-transitory processor-readable storage medium of claim 37, wherein the stored processor-executable software instructions are configured to cause a processor to perform operations such that disabling the hypervisor further comprises at least one of:
  suspending restricting the HLOS's accesses to hardware interrupts;
  suspending restricting the HLOS's accesses to hardware timers; and
  suspending restricting the HLOS's I/O accesses.

39. A non-transitory processor-readable storage medium having stored thereon processor-executable software instructions configured to cause a processor to perform operations for managing memory on a computing device, the operations comprising:
  initializing a hypervisor, a security monitor, and a high-level operating system (HLOS);
  disabling the hypervisor after initialization;
  monitoring for a signal from the security monitor to start a sandbox session;
  enabling the hypervisor in response to receiving the signal from the security monitor to start the sandbox session;
  implementing access control while the hypervisor is enabled;
  determining whether the sandbox session is over;
  performing a sandbox session tear-down procedure in response to determining that the sandbox session is over; and
  disabling the hypervisor after performing the sandbox session tear-down procedure.

40. The non-transitory processor-readable storage medium of claim 39, wherein the stored processor-executable software instructions are configured to cause a processor to perform operations such that determining whether the sandbox session is over comprises receiving another signal indicating that the sandbox session is over.

41. The non-transitory processor-readable storage medium of claim 39, wherein the stored processor-executable software instructions are configured to cause a processor to perform operations such that performing the sandbox session tear-down procedure comprises:
  freeing all buffers for a sandboxed component; and
  restoring second stage translation page tables to remove all fragmentations.

42. A non-transitory processor-readable storage medium having stored thereon processor-executable software instructions configured to cause a processor to perform operations for managing memory on a computing device, the operations comprising:
  initializing a hypervisor, a security monitor, and a high-level operating system (HLOS);
  disabling the hypervisor after initialization;
  monitoring for a signal from the security monitor to start a sandbox session;
  enabling the hypervisor in response to receiving the signal from the security monitor to start the sandbox session; and
  implementing access control while the hypervisor is enabled,
  wherein the stored processor-executable software instructions are configured to cause a processor to perform operations such that enabling the hypervisor comprises:
    enabling PL0 and PL1 second stage memory management units;
    configuring interrupt requests to be taken in hypervisor mode; and
    calling system memory management units (SMMU) drivers to put all active SMMU context banks in first stage translations nested within second stage translations.

43. The non-transitory processor-readable storage medium of claim 42, wherein the stored processor-executable software instructions are configured to cause a processor to perform operations further comprising starting interprocessor communications with a digital signal processor.

44. The non-transitory processor-readable storage medium of claim 42, wherein the stored processor-executable software instructions are configured to cause a processor to perform operations further comprising handling SMMU faults.

45. A non-transitory processor-readable storage medium having stored thereon processor-executable software instructions configured to cause a processor to perform operations for managing memory on a computing device, the operations comprising:
  initializing a hypervisor, a security monitor, and a high-level operating system (HLOS);
  disabling the hypervisor after initialization;
  monitoring for a signal from the security monitor to start a sandbox session;
  enabling the hypervisor in response to receiving the signal from the security monitor to start the sandbox session; and
  implementing access control while the hypervisor is enabled,
  wherein the stored processor-executable software instructions are configured to cause a processor to perform operations such that implementing access control comprises implementing second stage translations and further comprises at least one of:
    resuming restricting the HLOS's accesses to hardware interrupts;
    resuming restricting the HLOS's accesses to hardware timers; and
    resuming restricting the HLOS's I/O accesses.

46. A non-transitory processor-readable storage medium having stored thereon processor-executable software instructions configured to cause a processor to perform operations for managing memory on a computing device, the operations comprising:
  initializing a hypervisor, a security monitor, and a high-level operating system (HLOS);
  disabling the hypervisor after initialization;
  monitoring for a signal from the security monitor to start a sandbox session;
  enabling the hypervisor in response to receiving the signal from the security monitor to start the sandbox session; and
  implementing access control while the hypervisor is enabled,
  wherein the stored processor-executable software instructions are configured to cause a processor to perform operations such that:
    implementing access control comprises implementing second stage translations; and
    implementing second stage translations comprises:
      monitoring for an attempt by the HLOS to allocate memory; and
      providing to the HLOS one or more physical addresses in a physical address space accessible to the HLOS when the HLOS attempts to allocate memory.

47. The non-transitory processor-readable storage medium of claim 46, wherein the stored processor-executable software instructions are configured to cause a processor to perform operations further comprising:
  determining whether a sandboxed component is attempting to allocate memory when the HLOS attempts to allocate memory; and
  providing physical addresses to the sandboxed component from the physical addresses in the physical address space in response to determining that the sandboxed component is attempting to allocate memory.

48. The non-transitory processor-readable storage medium of claim 47, wherein the stored processor-executable software instructions are configured to cause a processor to perform operations such that providing the physical addresses to the sandboxed component comprises:

removing the physical addresses to be provided to the sandboxed component from the physical addresses in the physical address space that are accessible to the HLOS; and providing the physical addresses to the sandboxed component from available physical addresses in the physical address space.

* * * * *